United States Patent
Sekine

(10) Patent No.: US 7,457,494 B2
(45) Date of Patent: Nov. 25, 2008

(54) DISPERSION COMPENSATOR, OPTICAL TRANSMISSION SYSTEM AND OPTICAL TRANSMISSION METHOD

(75) Inventor: Kenro Sekine, Fuchu (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 0 days.

(21) Appl. No.: 11/833,086

(22) Filed: Aug. 2, 2007

(65) Prior Publication Data

US 2008/0151377 A1  Jun. 26, 2008

(30) Foreign Application Priority Data

Dec. 20, 2006  (JP) ............... 2006-342070

(51) Int. Cl.
 *G02B 6/26* (2006.01)
 *G02F 1/01* (2006.01)
(52) U.S. Cl. ............... 385/17; 385/15; 385/1
(58) Field of Classification Search ........... 385/15, 385/17, 1
See application file for complete search history.

(56) References Cited

U.S. PATENT DOCUMENTS

| | | | | |
|---|---|---|---|---|
| 5,838,867 | A * | 11/1998 | Onishi et al. ............... | 385/123 |
| 7,054,559 | B1 * | 5/2006 | Le et al. ............... | 398/79 |
| 2001/0021294 | A1 * | 9/2001 | Cai et al. ............... | 385/37 |
| 2003/0086647 | A1 * | 5/2003 | Willner et al. ............... | 385/37 |
| 2003/0219198 | A1 * | 11/2003 | Zhou ............... | 385/24 |
| 2004/0047551 | A1 * | 3/2004 | Ramachandran ............... | 385/28 |
| 2004/0109691 | A1 * | 6/2004 | Miyazaki ............... | 398/98 |
| 2004/0208434 | A1 * | 10/2004 | Inagaki et al. ............... | 385/24 |

FOREIGN PATENT DOCUMENTS

JP     10-39155     2/1998

\* cited by examiner

*Primary Examiner*—K. Cyrus Kianni
(74) *Attorney, Agent, or Firm*—Mattingly, Stanger, Malur & Brundidge, PC

(57) ABSTRACT

A variable dispersion slope compensator with a high-accuracy and a low-cost structure for compensating the dispersion slope compensation error accompanying variations in the zero-dispersion wavelength in transmission fibers in long-distance, high-speed WDM (wavelength division multiplexing) transmission systems. When the value by which the optical fiber dispersion slope (ps/nm/nm/km) is divided by the dispersion coefficient (ps/nm/km) is defined as the relative dispersion slope RDS (/nm), then the variable dispersion slope compensator includes a first dispersion compensation fiber group including at least two dispersion compensation fibers with a common relative dispersion slope; and a second dispersion compensation fiber group including at least two dispersion compensation fibers with a common relative dispersion slope different from the relative dispersion slope of the first group; and a patch cable group or an optical switching group for making an optional connection combination between the first and second dispersion compensation fiber groups.

7 Claims, 20 Drawing Sheets

FIG. 5

| | | DISPERSION COEFFICIENT | DISPERSION SLOPE | RDS | DISPERSION | | | |
|---|---|---|---|---|---|---|---|---|
| | | @1590nm | @1590nm | @1590nm | @1570nm | @1590nm | @1610nm |
| DCFa | -50ps/nm | -3.5 | -0.07 | 0.020 | -30 | -50 | -70 |
| | -100ps/nm | | | | -60 | -100 | -140 |
| | -200ps/nm | | | | -120 | -200 | -280 |
| DCFb | -50ps/nm | -2.1 | -0.07 | 0.033 | -16.6 | -50 | -83.3 |
| | -100ps/nm | | | | -33.3 | -100 | -166.6 |
| | -200ps/nm | | | | -66.6 | -200 | -333.3 |
| | | (ps/nm/km) | (ps/nm/nm/km) | (/nm) | (ps/nm) | (ps/nm) | (ps/nm) |

FIG. 6

| (d)ps-#(k) | DCFa (ps/nm) | | | DCFb (ps/nm) | | | TOTAL DCF DISPERSION (ps/nm) | | |
|---|---|---|---|---|---|---|---|---|---|
| | -50 | -100 | -200 | -50 | -100 | -200 | 1570nm | 1590nm | 1610nm |
| 50ps-#0 | ○ | × | × | × | × | × | -30.0 | -50.0 | -70.0 |
| 50ps-#1 | × | × | × | ○ | × | × | -16.7 | | -83.3 |
| 100ps-#0 | × | ○ | × | × | × | × | -60.0 | -100.0 | -140.0 |
| 100ps-#1 | ○ | × | × | ○ | ○ | × | -46.7 | | -153.3 |
| 100ps-#2 | × | ○ | × | × | × | × | -33.3 | | -166.7 |
| 150ps-#0 | ○ | ○ | × | ○ | × | × | -90.0 | -150.0 | -210.0 |
| 150ps-#1 | × | × | × | × | ○ | × | -76.7 | | -223.3 |
| 150ps-#2 | ○ | × | × | ○ | ○ | × | -63.3 | | -236.7 |
| 150ps-#3 | × | × | × | ○ | ○ | × | -50.0 | | -250.0 |
| ... | | | | | | | | | |
| 350ps-#4 | ○ | ○ | × | × | × | ○ | -156.7 | -350.0 | -543.3 |
| 350ps-#5 | × | ○ | × | ○ | ○ | ○ | -143.3 | | -556.7 |
| 350ps-#6 | ○ | × | × | × | ○ | ○ | -130.0 | | -570.0 |
| 350ps-#7 | × | × | × | ○ | ○ | ○ | -116.7 | | -583.3 |

DISPERSION COMPENSATOR, OPTICAL TRANSMISSION SYSTEM AND OPTICAL TRANSMISSION METHOD

CLAIM OF PRIORITY

The present application claims priority from Japanese application JP 2006-342070 filed on Dec. 20, 2006, the content of which is hereby incorporated by reference into this application.

FIELD OF THE INVENTION

This invention related to a dispersion compensator, and to a high-speed WDM (wavelength division multiplexing) transmission system including that optical transmission system, and relates in particular to a variable dispersion compensator for compensating the dispersion slope of the transmission fiber with high precision.

BACKGROUND OF THE INVENTION

In high-speed optical fiber communication, a characteristic called chromatic dispersion restricts the transmission speed and transmission distance as well as causing deterioration in the optical waveform. This chromatic dispersion (hereafter called, dispersion) is a linear effect in which the different velocities of the signal propagating in the optical fiber are dependent on the wavelength. Strictly speaking, the optical waveform contains multiple waveform components (has a spreading spectrum) and when the group speed (different velocities) are wavelength dependent, slowly progressing (lag) components and quickly progressing (lead) components appear. These components cause the waveform to spread and when the dispersion value from this spread can no longer be ignored, distortion appears in the waveform causing the receive characteristics to deteriorate. The dispersion magnitude is proportional to the fiber length so this dispersion limits the transmission distance.

A dispersion compensator is generally utilized as a technique to avoid the effects of waveform distortion due to dispersion. The dispersion compensator is an optical device that provides dispersion that is an inverse quantity of the dispersion on the optical within the transmission path. This dispersion compensator can therefore cancel out the dispersion within the optical fiber and suppress waveform distortion due to dispersion. Dispersion compensation fiber (DCF) is most often used as the dispersion compensator. The structure and material of the dispersion compensation fiber are added so as to maintain dispersion characteristics that are opposite (opposite sign) those along the optical fiber's transmission path.

The dispersion compensation fiber is designed to cancel out the dispersion on the optical fiber (hereafter called, transmission fiber) of the transmission path. In single wavelength transmission for example, the dispersion compensation fiber is designed to provide a negative dispersion that is equivalent to the absolute dispersion value so as to compensate the dispersion on the transmission fiber signal wavelength.

However, the wavelength dependency of the dispersion must be taken into account when utilizing dispersion compensation fibers in WDM (wavelength division multiplexing) transmission. The transmission fiber dispersion value is usually larger on the long wavelength side, and can approximate a straight line on bands using WDM transmission. The dispersion (magnitude) per unit of distance, or in other words the straight line tilt when the dispersion coefficient (units: ps/nm/km) wavelength dependency approximates a straight line is called the dispersion slope (units: ps/nm/nm/km). The dispersion on the transmission fiber is a positive value, and for example in the dispersion-shifted fiber which is one of the main transmission fiber types, is generally a value of approximately 0.07 ps/nm/nm/km.

The dispersion along the transmission path becomes larger on the long wavelength side due to this dispersion slope, and in order to fully compensate for dispersion in WDM transmission where multiple channel signals are multiplexed along the direction of the wavelength, a DCF must be used whose dispersion compensation increases the longer the wavelength.

A method was for example disclosed for installing a dispersion compensation fiber 103 designed for compensating the dispersion slope as well as the dispersion, relative to the transmission fiber 102 as shown in FIG. 17 in JP-A No. 10(1998)-39155: Masashi Onishi et al., Invention, "Dispersion compensation fiber and Optical Dispersion Systems including same." The interrelation of the transmission fiber 102 and dispersion compensation fiber 103 dispersion is shown in FIG. 18. The dispersion of the transmission fiber 102 reaches a dispersion (magnitude) of zero at the zero-dispersion wavelength ($\lambda 0$), and from thereon increases towards the right shoulder. When the transmission band for sending the actual WDM signal is the wavelength $\lambda L$ (shortest wavelength) to the wavelength $\lambda U$ (longest wavelength), then the dispersion compensating fiber (103) is designed to equalize the dispersion absolute value along the signal band (from $\lambda L$ to $\lambda U$), and further possesses a dispersion whose sign is negative, so as to completely cancel out the dispersion of the transmission fiber. The residual dispersion after this dispersion compensation is therefore zero along the signal band (from $\lambda L$ to $\lambda U$).

SUMMARY OF THE INVENTION

However, as generally known, there are variations in the zero-dispersion length in each fiber unit as shown for the transmission fiber characteristics in FIG. 19, and as a consequence, variations also occur as shown in the oblique line section in FIG. 19 for the dispersion coefficient within the transmission band. Variations on the zero-dispersion wavelength (from $\lambda 0a$ to $\lambda 0b$) of 10 nm or more in the previously described dispersion-shifted fiber are not unusual.

Zero-dispersion wavelength might occur when using dispersion compensation fibers designed to compensate the dispersion slope as described above in WDM transmission systems whose transmission fibers have fiber unit variations. These zero-dispersion wavelength variations might cause compensation errors that prevent the residual dispersion from reaching zero after dispersion compensation.

This phenomenon is specifically described as follows using the numerical examples in FIG. 20. The zero-dispersion wavelength of the transmission fiber is set with variations from 1540 nm to 1560 nm, and the signal band is from 1570 nm to 1610 nm. The fiber a and the fiber b are respectively equivalent to the case where the zero-dispersion wavelength is the shortest wavelength, and the case where the zero-dispersion wavelength is the longest wavelength within the above distribution. Dispersion coefficients at 1570 nm for fiber a and fiber b are respectively 0.7 and 2.1 ps/nm/km; and the dispersion coefficients at 1610 nm are respectively 3.5 and 4.9 ps/nm/km. The dispersion compensation fiber is designed for the average characteristics of the dispersion compensating fiber on this bandwidth or in other words is designed based on a value intermediate between the fiber a and the fiber b. The dispersion coefficient at 1570 nm is consequently −1.4 ps/nm/km, and the dispersion coefficient at 1590 nm is −4.2 ps/nm/km.

The case when using dispersion compensation fibers to compensate the dispersion in a fiber a, whose length is 60 kilometers, and a fiber b whose length is 100 kilometers is considered here. The dispersion coefficients in fiber a, and in a fiber b at an intermediate wavelength of 1590 nm on the band are respectively 3.5 and 2.1 ps/nm/km so that dispersion in the 60 kilometer long fiber a, and the 100 kilometer long fiber b is 210 ps/nm (=3.5×60, or 2.1×100) in either case. The dispersion compensation fibers should therefore be designed so that the compensation at 1590 nm is −210 ps/nm.

However, as shown in FIG. 21, the characteristics required for 100 percent compensation of fiber a, and the characteristics required for 100 percent compensation of fiber b (in other words, the characteristics when inverting just the dispersion signs of fiber a and fiber b) are a match at only one point on the 1590 nm wavelength but there is no match on any other wavelength. The residual dispersion that is output from the dispersion compensation fiber designed for average characteristics therefore reaches zero only at the 1590 nm wavelength, and a compensation error occurs. The error at both ends of the band (from λL to λU) reaches a maximum, with the fiber a compensation error reaching ±35 ps/nm, and fiber b compensation reaching ±21 ps/nm. The dispersion compensation fibers of the related art therefore have the problem that the compensation error increases due to variations in the transmission fiber zero-dispersion wavelength.

This type of compensation error increases in optical repeaters during long-distance relay transmissions via repeaters. In these relay transmissions, dispersion compensation fibers are generally installed within the optical repeater to compensate the dispersion just before the transmission fiber. However when the above type of compensation error occurs in each span (length of fiber between optical amplifiers), then the compensation error accumulates, and the dispersion causes increased waveform distortion.

A widely known method apart from dispersion compensation fibers is to install a variable dispersion compensator just before the receiver, that capable of varying the dispersion. This variable dispersion compensator acts to compensate the compensation error (residual dispersion) that accumulated on each wavelength just before the receiver. However, the accumulated compensation error exceeded the range that the variable dispersion could be set on the variable dispersion compensator. The variable dispersion compensator therefore had the problem that it was incapable of correcting the compensation error.

When the mutual interaction between dispersion and non-linear phenomenon such as self-phase modulation (SPM) or cross phase modulation (XPM) are considered on the above variable dispersion compensator, then residual dispersion should preferably be suppressed not only at just before the receiver but also at each relay output. However, the dispersion compensation fibers of the related art had the problem that variations in the zero-dispersion wavelength of the transmission fibers caused residual dispersion at the outputs of each repeater; and possible waveform distortion due to the mutual interaction of non-linear phenomena and dispersion.

This invention therefore has the object of providing a dispersion compensator capable of compensating the zero-dispersion wavelength as well as the dispersion slope.

The structure proposed in the application of this invention to resolve the above problems is a dispersion compensator including: a first dispersion compensation fiber group containing at least one dispersion compensation fiber and, a second dispersion compensation fiber group containing at least one dispersion compensation fiber and, a patch cable group or an optical switching group for making a connection combination between either the first dispersion compensation fiber group or the second dispersion compensation fiber group; and characterized in that the relative dispersion slopes of the first dispersion compensation fiber group and the second dispersion compensation fiber group are different.

This invention is a variable dispersion slope compensator with a structure capable of compensating the dispersion caused by the zero-dispersion wavelength and the dispersion slope of the transmission fiber.

BRIEF DESCRIPTION OF THE DRAWINGS

FIG. 5 is a table showing typical characteristic values for the first and the second dispersion compensation fiber groups;

FIG. 6 is a table showing examples of dispersion compensation combinations achievable by the first embodiment;

DETAILED DESCRIPTION OF THE PREFERRED EMBODIMENTS

Figure 1:
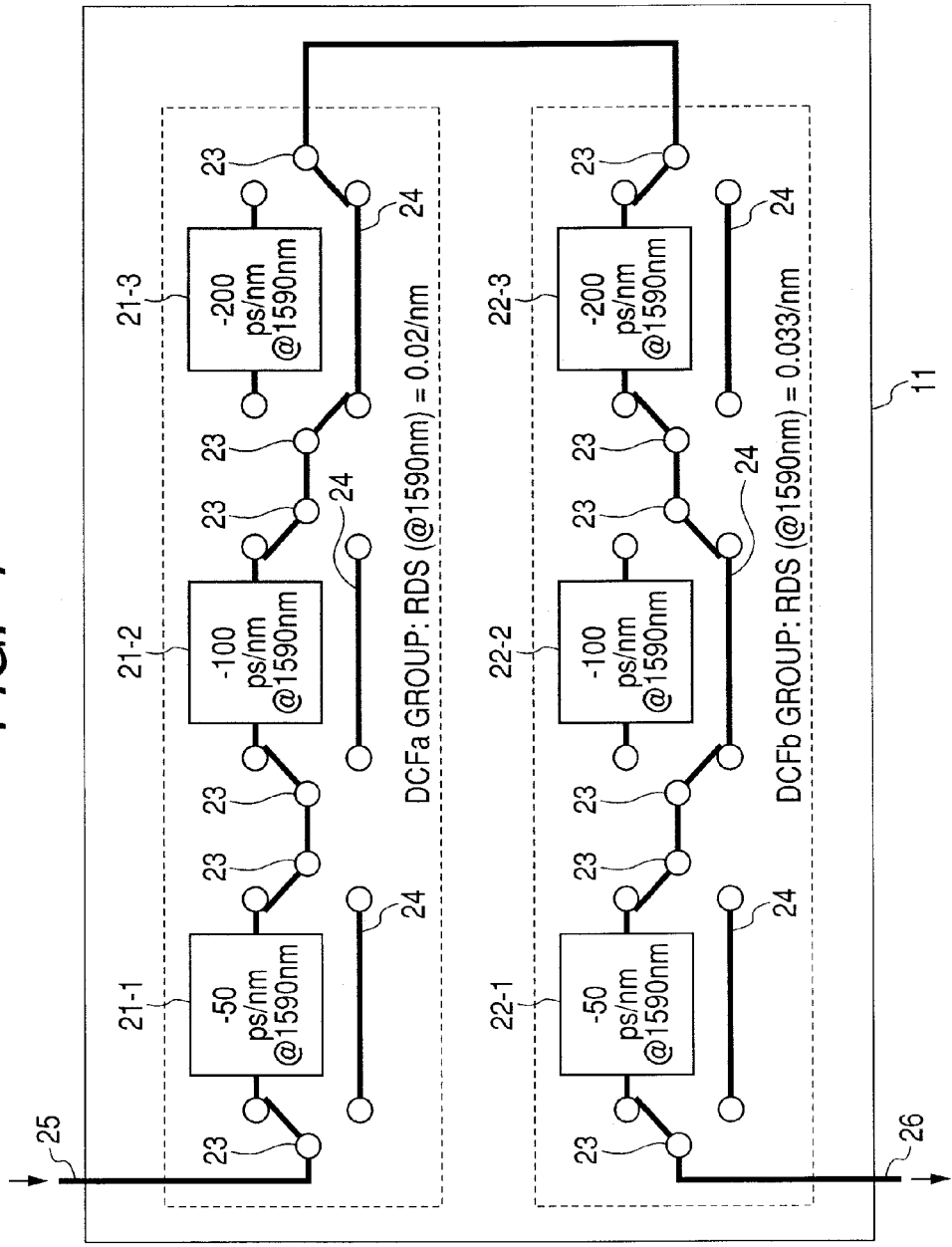
FIG. 1 is a diagram of the structure of the first embodiment of this invention.

The structure proposed in a first aspect of this invention is a variable dispersion slope compensator including a first dispersion compensation fiber group containing at least two or more dispersion compensation fibers jointly sharing a relative dispersion slope RDSa, when the relative dispersion slope RDS (/nm) is defined as the dispersion slope (ps/nm/nm/km) of the optical fiber from which the dispersion coefficient (ps/nm/km) value is subtracted; and a second dispersion compensation fiber group including at least two or more dispersion compensation fibers jointly sharing a relative dispersion slope RDSb different from the relative dispersion slope RDSa of the first dispersion compensation fiber group and; a patch cable group or an optical switching group for making an optional connection combination between either the first dispersion compensation fiber group or the second dispersion compensation fiber group.

The first aspect of this invention is a variable dispersion slope compensator capable of varying the dispersion slope caused by the zero dispersion wavelength of the transmission fiber and includes: a first dispersion compensation fiber group, and a second dispersion compensation fiber group with different relative dispersion slope RDS values, as well as a patch cable group or an optical switching group for making an optional connection combination between these dispersion compensation fiber groups.

The structure proposed in a second aspect of this invention is a variable dispersion slope compensator of the first aspect where the dispersion compensation of each dispersion compensation fiber in the first dispersion compensation fiber group, and the dispersion compensation of each dispersion compensation fiber in the second dispersion compensation fiber group are designed to reach an integer multiple of the quantity in the pre-established dispersion compensation step at a typical wavelength.

The structure proposed in a third aspect of this invention is a variable dispersion slope compensator where the dispersion compensation of each dispersion compensation fiber in the first dispersion compensation fiber group, and each dispersion compensation fiber in the second dispersion compensation fiber group is designed to reach 2 to the Nth times (N is an integer multiple) the quantity in the pre-established dispersion compensation step at a typical wavelength.

In the second and the third aspects of the variable dispersion slope compensator of this invention capable of adjusting the slope with high precision, the dispersion compensation of each dispersion compensation fiber making up the first dispersion compensation fiber group and the second dispersion compensation fiber group, are designed to reach an integer multiple or 2 to the Nth times (N is an integer) the pre-established dispersion compensation step at each typical wavelength.

The structure proposed in a fourth aspect of this invention is a variable dispersion slope compensator of the first aspect where the typical wavelength is a wavelength in the center of the transmission signal band or a wavelength near the center.

The structure proposed in a fifth aspect of this invention is an optical transmission system characterized in including multiple transmission fibers and variable dispersion slope compensators of the first aspect of this invention.

The structure proposed in a sixth aspect of this invention is an optical transmission system of the fifth aspect of the invention characterized in that the zero-dispersion wavelength of the transmission fiber contains variations in each fiber unit and; the relative dispersion slope RDS of the transmission fiber when the zero-dispersion wavelength is positioned on the short wavelength side from the center distribution of that same zero-dispersion wavelength is made to match the relative dispersion slope RDSa of the first dispersion compensation fiber group; and the relative dispersion slope RDS of the transmission fiber when the zero-dispersion wavelength is positioned on the long wavelength side from the center distribution of that same zero-dispersion wavelength is made to match the relative dispersion slope RDSb of the second dispersion compensation fiber group.

The structure proposed in the sixth aspect of this invention is a variable dispersion slope compensator capable of adjusting the slope over a wide area by matching the transmission fiber RDS value when the zero-dispersion wavelength is positioned on the short wavelength side from the center distribution, with the RDS value of the first dispersion compensation fiber group; and the transmission fiber RDS value when the zero-dispersion wavelength is positioned on the long wavelength side from the center distribution, with the RDS value of the second dispersion compensation fiber group; versus zero-dispersion wavelength variations assumed present in the transmission fiber.

The structure proposed in the seventh aspect of this invention for the optical transmission system of the fifth aspect is characterized in utilizing a dispersion-shifted fiber whose zero-dispersion wavelength is distributed within a range of 1510 nm to 1590 nm, as the transmission fiber.

The optical transmission system in the seventh aspect of this invention contains a remotely operated optical switch group within the variable dispersion slope compensator, and calculates the desired dispersion compensation for each variable dispersion compensator based on the transmission fiber dispersion information within the optical transmission system and, lowers the residual dispersion at the output of each optical repeater across the entire repeater transmission system as well as residual dispersion in the receiver by remotely operating the optical switches in the optical transmission system.

A structure provided in the eighth aspect of this invention according to the optical transmission system of the fifth aspect is characterized in using the L band (1565 nm to 1615 nm) as the signal band.

A structure provided in the ninth aspect of this invention according to the optical transmission system of the fifth aspect is characterized in utilizing the C band (1525 nm to 1565 nm) as the signal band.

A structure provided in the tenth aspect of this invention is an optical transmission system according to the fifth aspect and characterized in that the optical switch group within the variable dispersion slope compensator is capable of being operated by remote control, and moreover calculates the dispersion compensation of each variable dispersion slope compensator so that the residual dispersion is within the desired range based on dispersion information for the transmission fibers within the optical transmission system and, remotely operates the optical switches to set the calculated dispersion compensation.

First Embodiment

A first embodiment of this invention is described next while referring to FIG. 1. A variable dispersion slope compensator 11 includes a first dispersion compensation fiber group 21-1, 2, 3, and a second dispersion compensation fiber group 22-1, 2, 3; and 1×2 optical switches 23 installed on both ends of each dispersion compensation fiber. Through fibers 24 are installed at the dispersion compensation fibers for the optical switches 23 and the other port. Optical signals are input from an input port 25 on the variable dispersion slope compensator 11 and then propagated to any of the dispersion compensation fibers 21-1, 2, 3, and 22-1, 2, 3, or to the through fibers 24 by switching the required optical switch 23, and then output from the output port 26. In other words, the optical switches 23 are switched as needed to make the desired connection combination of dispersion compensation fibers 21-1, 2, 3, and 22-1, 2, 3.

The first dispersion compensation fiber group 21-1, 2, 3, and the second dispersion compensation fiber group 22-1, 2, 3 in the variable dispersion slope compensator 11 are designed to provide the following characteristics.

Figure 2:
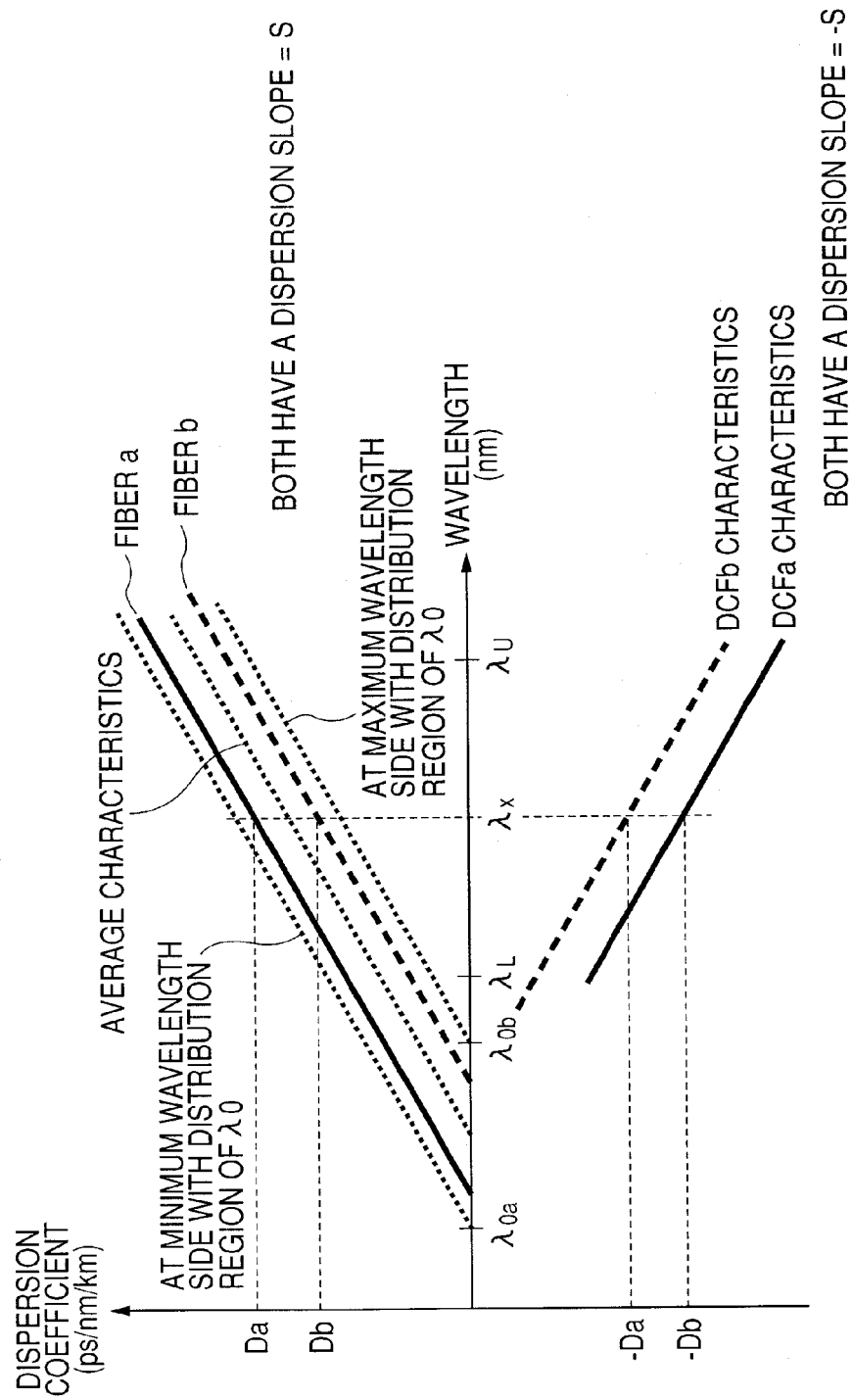
FIG. 2 is a graph of the design technique for the first and the second dispersion compensation fibers.

The zero-dispersion wavelength is spread between $\lambda 0a$ to $\lambda 0b$ for the dispersion coefficients of the transmission fiber shown in FIG. 2. Also, the WDM signal wavelength band is set to $\lambda L$ on the shortest wavelength side, and to $\lambda U$ on the longest wavelength side. Here, the fiber a is positioned more towards the short wavelength side than the average characteristic, and the fiber b is positioned more towards the long wavelength side than the average characteristic versus the zero-dispersion wavelength. The dispersion coefficients for the typical wavelength $\lambda x$ within the band are respectively Da and Db (ps/nm/km) in the fiber a and the fiber b. The dispersion slope is S (ps/nm/nm/km) for either case of the fiber a or fiber b.

The DCFa here is designed to compensate the dispersion and dispersion slope of fiber a, or in other words designed so that the dispersion coefficient at the typical wavelength $\lambda x$ becomes $-Da$, and that the dispersion slope becomes $-S$. Moreover, the DCFb is designed to compensate the dispersion and dispersion slope of fiber b, or in other words designed so that the dispersion coefficient at typical wavelength $\lambda x$ becomes $-Db$, and that the dispersion slope becomes $-S$.

To restate this in other words, when using a relative dispersion slope RDS (units:/nm) defined as the value where the optical fiber dispersion slope (units: ps/nm/nm/km) is divided by the dispersion coefficient (units: ps/nm/km); the DCFa is designed so that the relative dispersion slope RDS at typical wavelength $\lambda x$ becomes RDSa=S/Da; and the DCFb is designed so that the relative dispersion slope RDS at typical wavelength $\lambda x$ becomes RDSb=S/Db.

Figure 3:
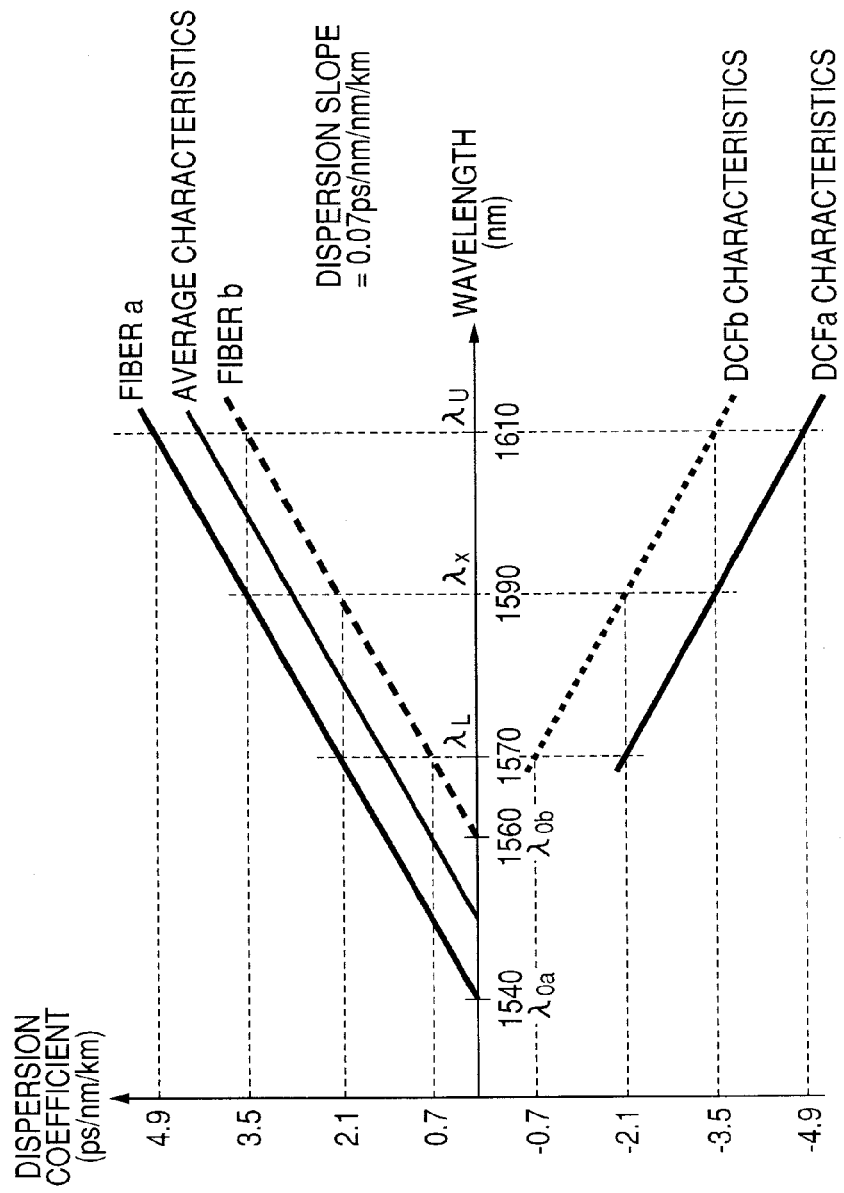
FIG. 3 is a graph showing a typical design for the first and the second dispersion compensation fibers.

A specific numerical example is shown in FIG. 3. The transmission fiber dispersion is spread between 1540 nm ($\lambda 0a$) to 1560 nm ($\lambda 0b$) and the dispersion slope is set at 0.07 ps/nm/nm/km. The shortest wavelength side of the WDM signal wavelength band is set as 1570 nm ($\lambda L$), and the longest wavelength side as 1610 nm ($\lambda x$), and the typical wavelength within the signal band is 1590 nm ($\lambda x$) which is the band center. Here, the distribution for the zero-dispersion wavelength of fiber a is positioned on the shortest wavelength side (1540 nm) and, the distribution for the zero-dispersion wavelength of fiber b is positioned on the longest wavelength side 1560 nm. In this case, the DCFa is designed so that the dispersion slope is −0.07 ps/nm/nm/km; and the dispersion at the typical wavelength of 1590 nm is −3.5 ps/nm/km. Also, the DCFb is designed so that the dispersion slope is −0.07 ps/nm/nm/km; and the dispersion at the typical wavelength of 1590 nm is −2.1 ps/nm/km. As shown in the numerical example in FIG. 1, expressed using the relative dispersion slope RDS, the DCFa (21 -1, 2, 3) is designed so that the RDF becomes 0.02/nm (=0.07/3.5). Also, the DCFb (22 -1, 2, 3) is designed so that the RDS is 0.033/nm (=0.07/2.1).

Figure 4:
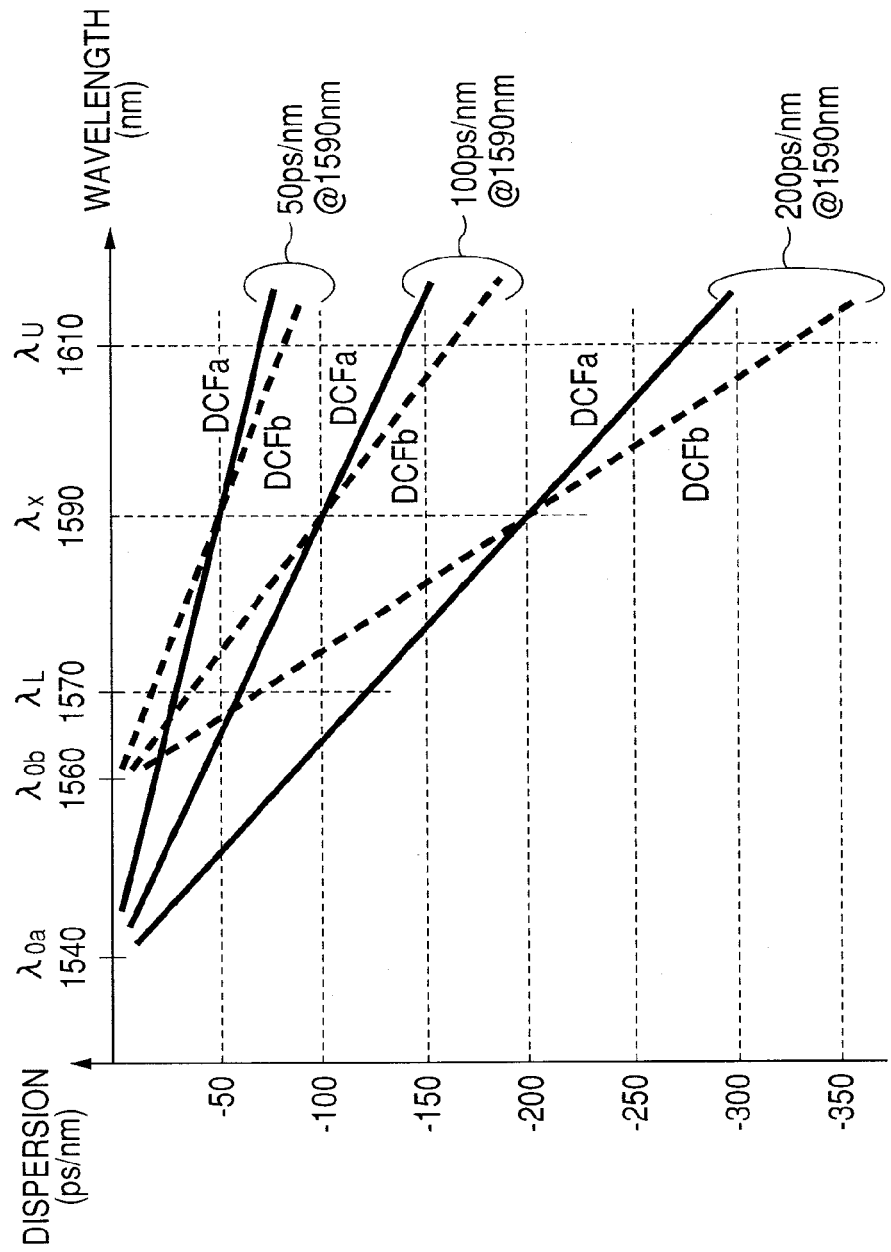
FIG. 4 is a dispersion profile for the first and the second dispersion compensation fiber groups.

Further, each of the fibers making up the DCFa group 21 -1, 2, 3 and the DCFb group 22 -1, 2, 3 are set so that the dispersion (dispersion compensation) at the typical wavelength is an M multiple (M=1, 2, 3 . . . ) or is 2 to the Nth times (N=1, 2, 3 . . . ) the specified dispersion step value Ds (ps/nm). As a specific numerical example, consider the case where the dispersion is made 2 to the Nth times (N=1, 2, 3 . . . ) or in other words 1 time, 2 times or 4 times the dispersion step value (Ds) of −50 ps/nm. As shown in the numerical example in FIG. 1, the respective dispersion (magnitudes) at the typical wavelength 1590 nm for each dispersion compensation fibers of the DCFa group 21-1, -2, -3 is −50, −100, and −200 ps/nm. In the same way, the dispersion at typical wavelength 1590 nm for each dispersion compensation fiber of the DCFb group 22-1, -2, -3 is also −50, −100, and −200 ps/nm. The dispersion profile for the DCFa 21-1, -2, -3 and the DCFb 22-1, 2, 3 is shown in FIG. 4, and the typical characteristic values are shown in the table in FIG. 5.

Switching of the optical switches 23 as needed in the variable dispersion slope compensator 21 shown in FIG. 1 including the DCFa 21-1, -2, -3 and DCFb 22-1, 2, 3 designed as related above is described next. Switching the optical switch 23 changes the DCF 21-1, -2, -3 and 22-1, 2, 3 connection combinations and changes the dispersion between the input port 25 and the output port 26. On the other hand, even at different connection combinations, there are multiple combinations where the dispersion is equivalent on the typical wavelength $\lambda x$. For example at a combination for a dispersion −100 ps/nm, can be used for a single DCFa 21-2 at a dispersion of −100 ps/nm, or for DCFa (21-1) and DCFb (21-1) both having a dispersion of −50 ps/nm, or for a single DCFb (22-2) whose dispersion is −100 ps/nm.

In order to simplify the notation for using symbols to identify these type of combinations, the combination for the two quantities of "absolute value for total dispersion at the typical wavelength, d" and "value for total dispersion for selected DCFb after subtracting dispersion step Ds k"; are expressed as "d ps-#k". The combination achieving the dispersion −100 ps/nm for example is shown by the notation "100 ps-#0" in the case of a single DCFa 21-2 for the dispersion −100 ps/nm; the combination achieving the dispersion −50 ps/nm for DCFa 21-1 and DCFb 22-1 is shown by the notation "100 ps-#1"; and the case where the single DCFb 22-2 for the dispersion −100 ps/nm is shown by the notation "100 ps-#2".

The case where the connection combinations for the dispersion compensating fibers 21-1, -2, -3 and 22-1, 2, 3 were organized using the notation "d ps-#k" when the optical switch 23 was switched are shown in FIG. 6. The circle (○) mark in the figure signifies the applicable dispersion compensating fiber is selected, and the x mark signifies the applicable dispersion compensating fiber is not selected (in other words, selecting the through fiber side).

The DCFa 21-1, 2, 3 and DCFb 22-1, 2, 3 possess mutually different relative dispersion slope values as described above so that changing the DCF combination (or in other words, changing the "value for total dispersion of selected DCFb divided by dispersion step Ds, k") allows changing the relative dispersion slope RDS value for that connection combination. In other words, though the dispersion magnitudes are all the same at the typical wavelength 1590 nm among combinations in FIG. 6 where the total dispersion is the same; the dispersion can be changed at both ends of the band at 1570 nm and 1610 nm. Considering for example the case where the total dispersion's absolute value d=−100 ps/nm, the dispersion magnitude is −100 ps/nm at the typical wavelength 1590 nm for any of the "100 ps-#0", "100 ps-#1", "100 ps-#2" combinations. However, in the case where the dispersion magnitudes are respectively "100 ps-#0", "100 ps-#1", "100 ps-#2" at 1570 nm, then the values reach −60, −46.7, −33.3 ps/nm, and decrease along with an increase in the k value. On the other hand, when the dispersion is respectively "100 ps-#0", "100 ps-#1", "100 ps-#2", at 1610 nm, then the values become −140, −153.3, −166.7 ps/nm, and increase along with an increase in the k value. In other words, the relative dispersion slope value RDS can be changed by changing the k value.

As described previously, each of the fibers making up the DCFa group 21-1, 2, 3 and the DCFb group 22-1, 2, 3 are set so that the dispersion (dispersion compensation) at the typical wavelength reaches an M multiple (M=1, 2, 3 . . . ) or is 2 to the Nth times (N−1, 2, 3 . . . ) the specified dispersion step value Ds (ps/nm). Therefore by selecting one or multiple appropriate fibers from among the DCFa group 21-1, 2, 3 and then connecting these to allow achieving a total dispersion (d−k×Ds). In the same way, by selecting one or multiple appropriate fibers from among the DCFb group 22-1, 2, 3 and then connecting these, a total dispersion (k×Ds) can be achieved. Namely, the dispersion slope can be changed by changing the k value, in a state where the total dispersion is d from connecting these fibers. Setting the dispersion (dispersion compensation) so that the fibers making up the DCFa group 21-1, 2, 3 and the DCFb group 22-1, 2, 3 are an M multiple (M=1, 2, 3 . . . ) or are 2 to the Nth times (N=1, 2, 3 . . . ) the specified dispersion step value Ds (ps/nm), is effective in suppressing the total DCF quantity within the dispersion slope compensator.

Figure 7:
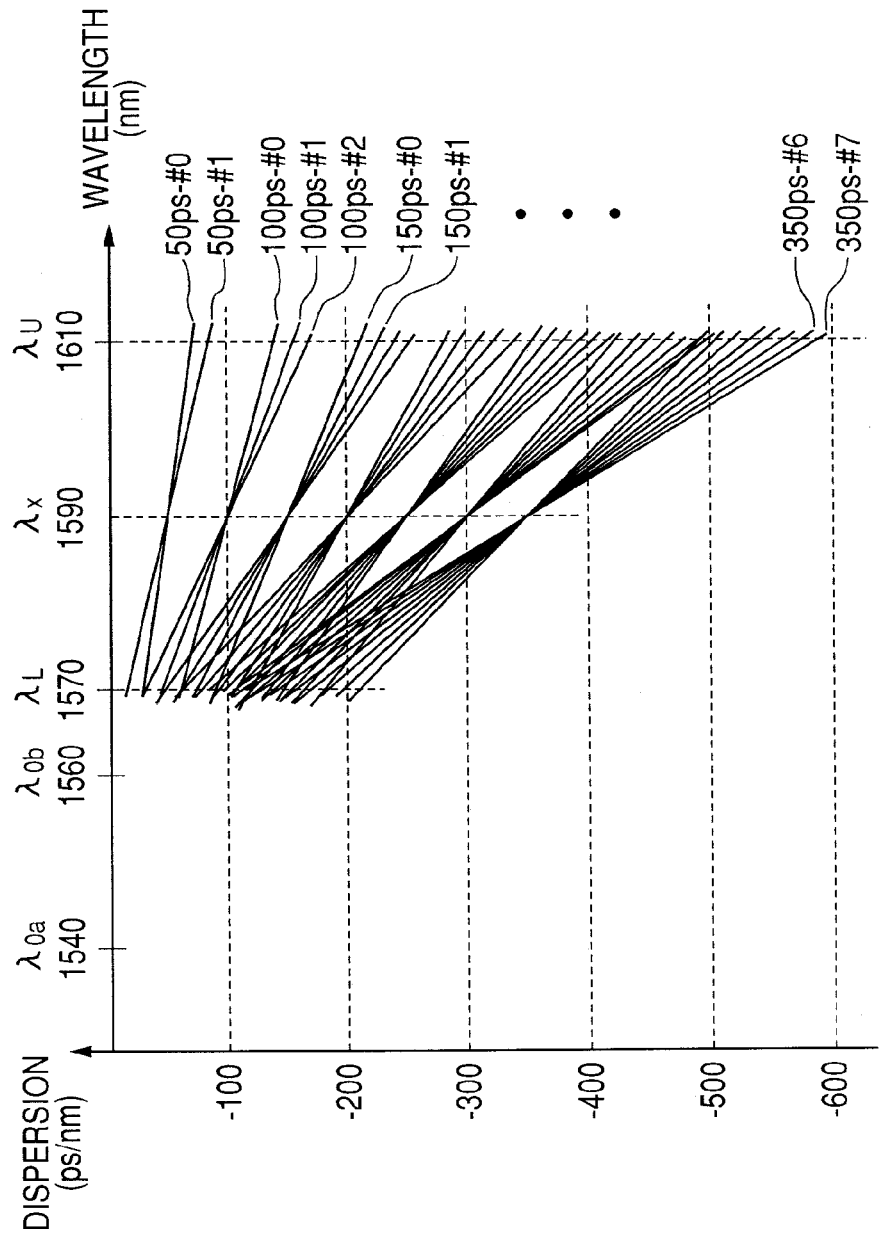
FIG. 7 is examples of dispersion profiles achievable by the first embodiment.

The state of the change in the relative dispersion slope RDS can be clearly seen from the dispersion profile shown in FIG. 7. Changing "the value for total dispersion of selected DCFb divided by dispersion step Ds, k") in a state where the "absolute value for total dispersion quantity at typical wavelength, d" is fixed, serves to change just the dispersion slope without changing the dispersion at that typical wavelength. A steep dispersion slope can be observed when the k value is increased to 0, 1, 2 while maintaining the dispersion −100 ps/nm at the typical wavelength 1590 nm for "100 ps-#0", "100 ps-#1", "100 ps-#2". This phenomenon is also the same in cases other than where the "absolute value for total dispersion quantity at typical wavelength, d" is 100 ps/nm. As expected, increasing the k, while maintaining the dispersion at the typical wavelength causes only the dispersion slope to become steep. In other words, in the structure in FIG. 1 of this invention switching the optical switch 23 renders a variable dispersion slope comparator capable of changing not only the dispersion but also the dispersion slope.

Figure 8:
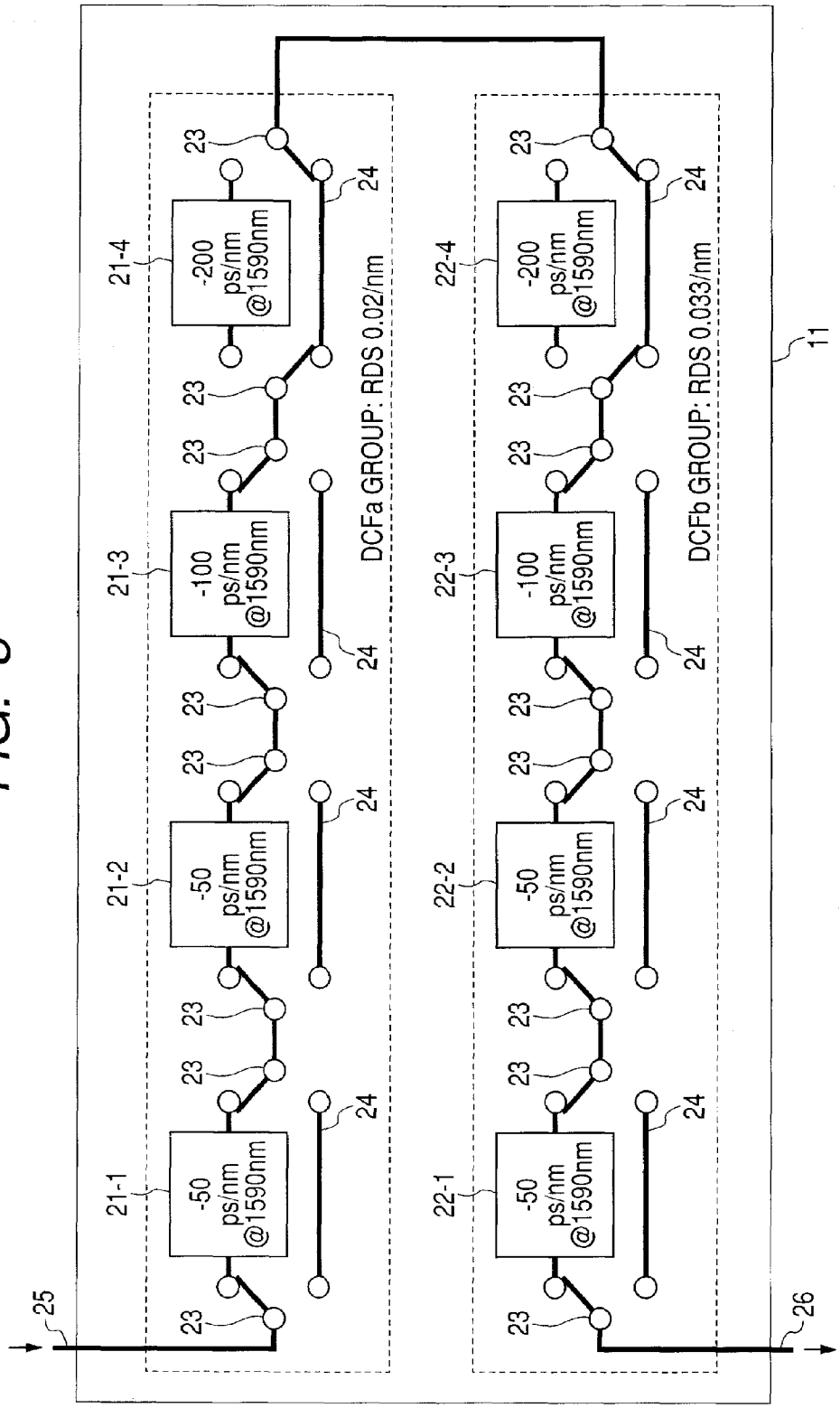
FIG. 8 is another example of the first embodiment.
Figure 9:
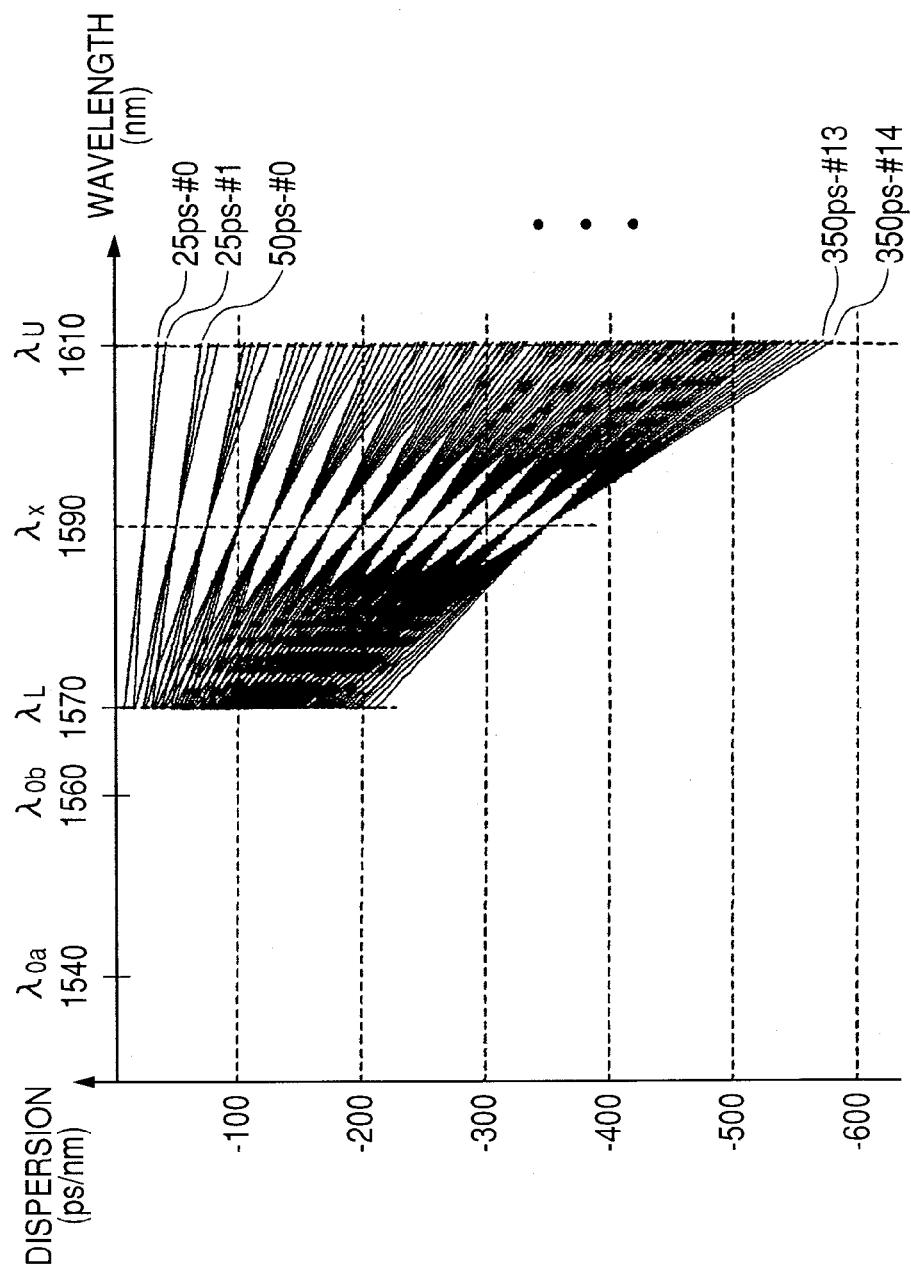
FIG. 9 is an example of a dispersion profiles achievable by another structure of the first embodiment.

In the structure of FIG. 1, the dispersion quantity is set to be 2 to the Nth times (N=1, 2, 3 . . . ) or in other words, 1 time, 2 times, 4 times the dispersion step value (Ds) −50 ps/nm, with the dispersion of each dispersion compensation fiber in the DCFa group 21-1, 2, 3 respectively set to −50, −100, −200 ps/nm at the typical wavelength 1590 nm. Reducing this dispersion step value (Ds) makes the variable dispersion comparator more accurate. Setting the dispersion step value (Ds) to −25 ps/nm, and utilizing a DCFa group and DCFb group each containing four DCF, so that the dispersion becomes 2 to the Nth times (N=1, 2, 3, 4 . . . ) or in other words, 1 time, 2 times, 4 times, 8 times, to become a dispersion in each dispersion compensation fiber of respectively −25, −50, −100, −200 ps/nm as shown in FIG. 8 at the typical wavelength 1590 nm, can yield a larger dispersion profile not only for the dispersion at the typical wavelength shown in FIG. 9 but even for the dispersion slope, and achieve a more accurate variable dispersion comparator.

In the examples in FIG. 1 and FIG. 3, the zero-dispersion wavelength for fiber a was positioned with the distribution on the shortest wavelength side (1540 nm); and the zero-dispersion wavelength for fiber b was positioned with the distribution on the longest wavelength side (1560 nm), and corresponding characteristic DCFa and DCFb values then set. However as shown in FIG. 2, this patent is effective even if the DCFa and DCFb characteristic values are set to correspond to any of the wavelengths on the shortest wavelength region where the fiber a zero dispersion wavelength is distributed, or to correspond to any of the wavelengths on the longest wavelength region where the fiber b dispersion wavelength is distributed. Namely, when using a relative dispersion slope RDS (units: /nm) defined as a value where the fiber dispersion slope (units: ps/nm/nm/km) is divided by the dispersion coefficient (units: ps/nm/km); the DCFb is designed so that the relative dispersion slope RDS becomes RDSb=S/Db at the typical wavelength λx, the DCFa is designed so that the relative dispersion slope RDS of DCFa becomes RDSa=S/Da at a typical wavelength λx and, this patent is therefore effective when the relation RDSa<RDSb is maintained. In other words, this patent is effective even if the characteristic values for DCFa and DCFb corresponding to a fiber a zero-dispersion wavelength positioned at 1545 nm, and a fiber b zero-dispersion wavelength positioned at 1555 nm, and also the freedom of design is improved.

In the numerical examples in the embodiment up to now, the typical wavelength (λx) was made the center wavelength (1590 nm) of the signal wavelength, however this patent can also be applied when the typical wavelengths are for example 1589.57 nm and 1590.41 nm, serving as the ITU-Grid wavelengths in the vicinity of the signal wavelength. Moreover, even if not near the center, this patent loses none of its effectiveness if the typical wavelength is an optional wavelength of for example 1595 nm on the long wavelength side or, an optional wavelength on the short wavelength side.

Also, in the numerical examples in the embodiment up to now, the dispersion in each of the DCF were set to be 2 to the Nth times (N=1, 2, 3) or in other words, 1 time, 2 times, 4 times the dispersion step value (Ds) −50 ps/nm. However, this patent is also effective for M multiples of 2 (M=1, 2, 3 . . . ) or in other words, 1 time, 2 times, 3 times the dispersion step value. Moreover, even if not 2 to the Nth times (N=1, 2, 3) or not M multiples of 2 (M=1, 2, 3 . . . ) for the dispersion step value (Ds) −50 ps/nm, this patent is also applicable for dispersion in the vicinity of those values.

In actual dispersion compensation fibers, the wavelength dependency is not linear but rather in addition to the dispersion slope is wavelength dependent on higher order components protruding upward or downward. The effects from these components must therefore be considered when high-accuracy dispersion compensation is needed but in this case also, the invention is capable of high accuracy compensation of dispersion components and there is no loss in the effectiveness of this invention.

As described above, a first dispersion compensation fiber group, and a second dispersion compensation fiber group with different relative dispersion slope RDS values, and optical switch group or a patch cable group for making different desired connection combinations among these compensating-fiber groups, make up a variable dispersion slope compensator capable of changing the dispersion slope in the dispersion compensators to compensate the dispersion caused by the zero-dispersion wavelength and the dispersion slope.

Also by designing each of the dispersion compensation fibers in the first dispersion compensation fiber group and a second dispersion compensation fiber group so that the dispersion compensation at each typical wavelength becomes an integer multiple or 2 to the Nth times (N is an integer) the pre-set dispersion-compensating step quantity, then a variable dispersion slope compensator capable of highly accurate slope adjustment can be rendered.

Further, by matching the first dispersion compensation fiber group RDS value with the transmission fiber RDS value when the zero dispersion wavelength is positioned on the short wavelength side from the distribution center; or the second dispersion compensation fiber group RDS value with the transmission fiber RDS value when the zero dispersion wavelength is positioned on the long wavelength side from the distribution center; versus variations (variations) in the assumed zero-dispersion wavelength of the transmission fiber, a variable dispersion slope compensator capable of adjusting the slope over a wide range can rendered.

The dispersion compensation fiber group of this patent is not limited to two dispersion compensation fiber groups, and for example three or more dispersion compensation fiber groups may be utilized to achieve more accurate compensation and to improve the freedom of design.

Second Embodiment

Figure 10:
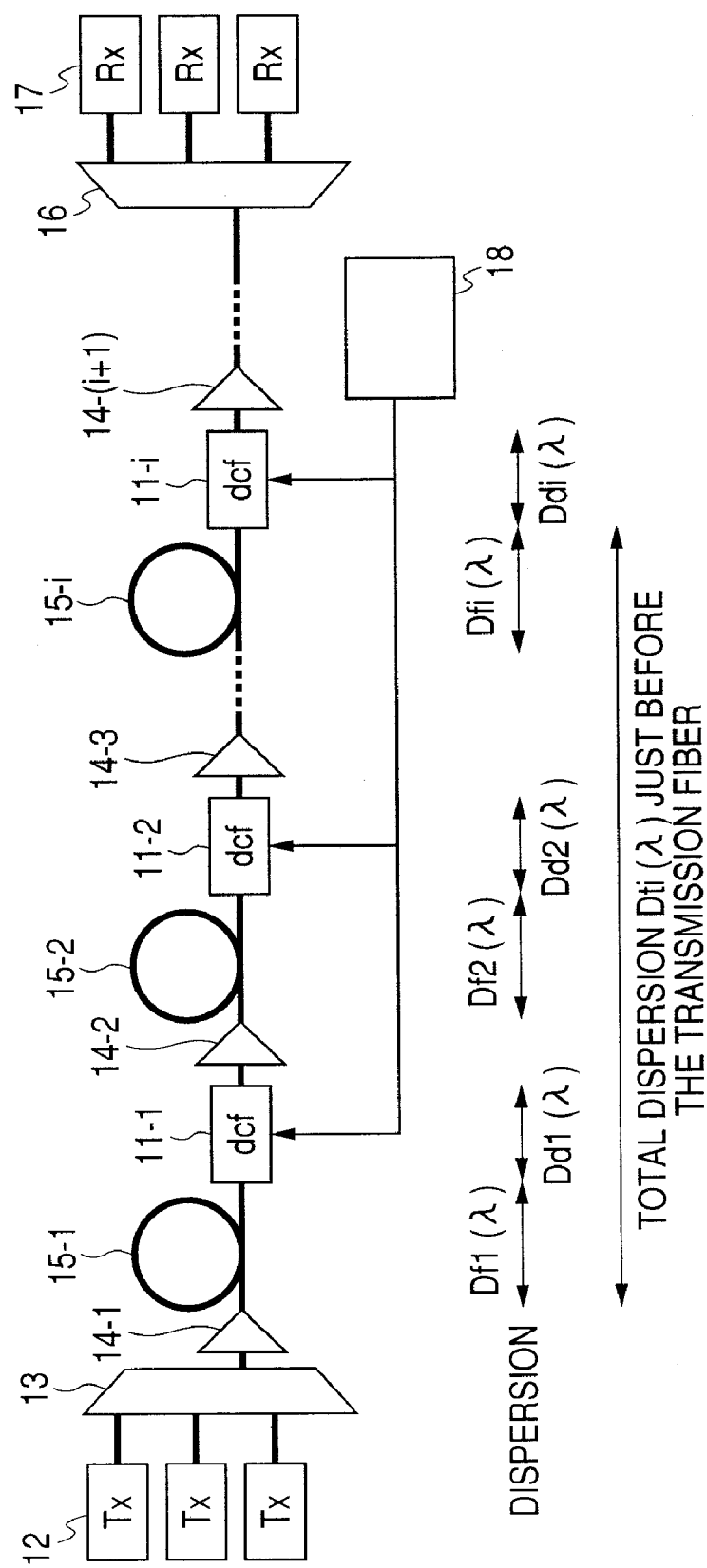
FIG. 10 is an example of the second embodiment of this invention.
Figure 11:
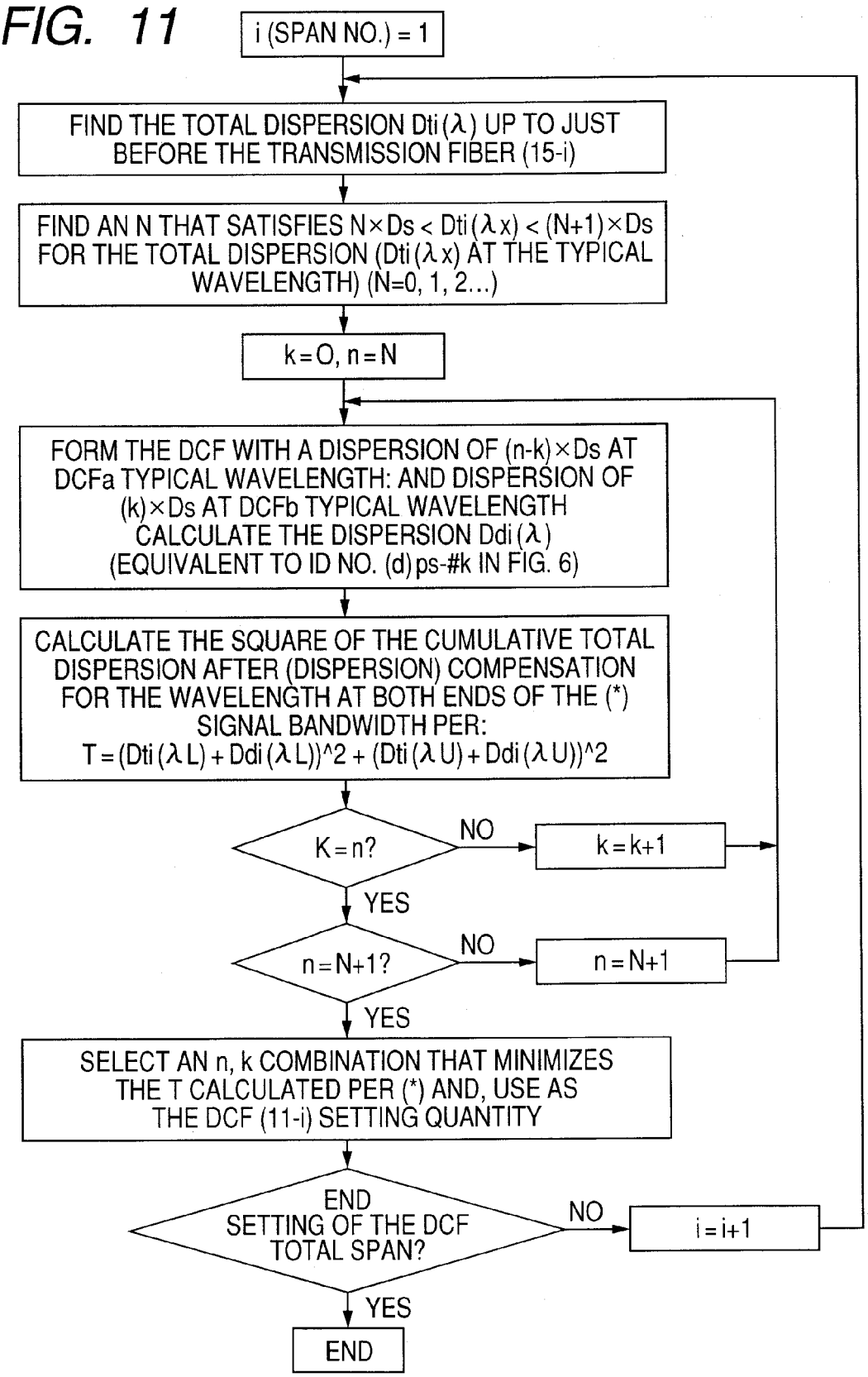
FIG. 11 is a flow chart showing the process for setting the dispersion compensation.

A second embodiment of this invention is described while referring to FIG. 10 and FIG. 11. FIG. 10 is a diagram of the multi-optical repeater transmission system including a variable dispersion slope comparator 11 for the first embodiment of this invention. A transmitter 12 forms a multiplexed WDM signal by utilizing an optical multiplexer 13. An optical amplifier 14-1 then amplifies that signal and inputs it onto the repeater transmission path. The transmission path includes transmission optical fibers 15-1, 2 . . . , variable dispersion slope compensators 11-1, 2 . . . , and optical amplifiers 14-1, 2 . . . The WDM signal that passed through the relay transmission path is divided in a wavelength divider 16, and reaches the receiver 17. A dispersion compensation setter 18 calculates the dispersion compensation of each variable dispersion slope compensator 11-1, 2 . . . and remotely sets the compensation.

FIG. 11 shows the flow in the process for setting the dispersion compensation for each variable dispersion slope compensator 11-1. Here, the case where setting the dispersion compensation on the variable dispersion slope compensator 11-$i$ for each applicable span No. 8 (default value 1) is considered. First of all, the total dispersion Dti ($\lambda$) up to just before the transmission fiber 15-$i$ is calculated. In the structure in FIG. 10, the total dispersion Dti ($\lambda$) is calculated by summing the total sum Df1 ($\lambda$)+Df2 ($\lambda$)+ . . . Dfi ($\lambda$) as the transmission fiber dispersion up to just before the variable dispersion slope compensator 11-I and, the total sum Dd1 ($\lambda$)+Dd2 ($\lambda$)+ . . . +Dd (i−1) ($\lambda$).

The total sum Df1 ($\lambda$), Df2 ($\lambda$) . . . Dfi ($\lambda$) for the transmission fiber dispersion may be entered manually into the dispersion compensation setter 18 as pre-measured field data. Also, a table area for managing the pre-measured field data may be placed within the dispersion compensation setter 18 or in an area accessible by the dispersion compensation setter 18, and the pre-measured field data can then be found by referring to this table. A separate dispersion measurement means may be installed and dispersion data acquired in real-time, and the transmission fiber dispersion then found by using that value. The dispersion settings Dd1 ($\lambda$), Dd2 ($\lambda$), . . . Dd (i−1) ($\lambda$) for just before the variable dispersion slope compensator can be acquired by storing the dispersion setting that were calculated and actually set beforehand within the dispersion compensation setter 18.

Next, a positive natural number N or zero satisfying N×Ds<Dti ($\lambda$x)<(N+1)×Ds is found for the dispersion step value Ds, and the total dispersion Dti ($\lambda$x) at the typical wavelength. This step signifies selecting a value nearest the total dispersion Dti ($\lambda$x) at the typical wavelength, from among the "absolute value for total dispersion quantity at typical wavelength, d" that are settable by the variable dispersion slope compensator 13.

After setting n=N, the dispersion Ddi ($\lambda$) is calculated for the connection combination when the dispersion at the typical wavelength of DCFa is (n−k)×Ds and the dispersion at the typical wavelength DCFb is set as k×DS. This task is equivalent to selecting the identification No. (n×Ds) ps-#k in FIG. 6.

Here, the squared sum of the accumulated dispersion after dispersion compensation is calculated for the longest wavelength and for the shortest wavelength. Moreover, their sum, T=(Dti ($\lambda$L )+Ddi ($\lambda$L))^2+(Dti ($\lambda$U)+Ddi ($\lambda$U))^2 is calculated.

This calculated T is stored in the memory along with the n and k combinations. The T for each combination of n=N, and also k=0, 1 2 . . . n is calculated in the same way. Also, the T for each combination of n=N+1, and for k=0, 1 2 . . . n is calculated in the same way.

After finished calculating the T for each combination, the n, k combination with the minimum T is retrieved, and this combination is the setting quantity for the variable dispersion slope compensator 11-$i$. In other words, a combination for "d ps-#k" is set where d=n×Ds.

In the above process, the i is calculated by consecutively increasing it 1 unit at a time, is set, and the setting flow ends when the variable dispersion slope compensator 13 is set for all spans.

Figure 12:
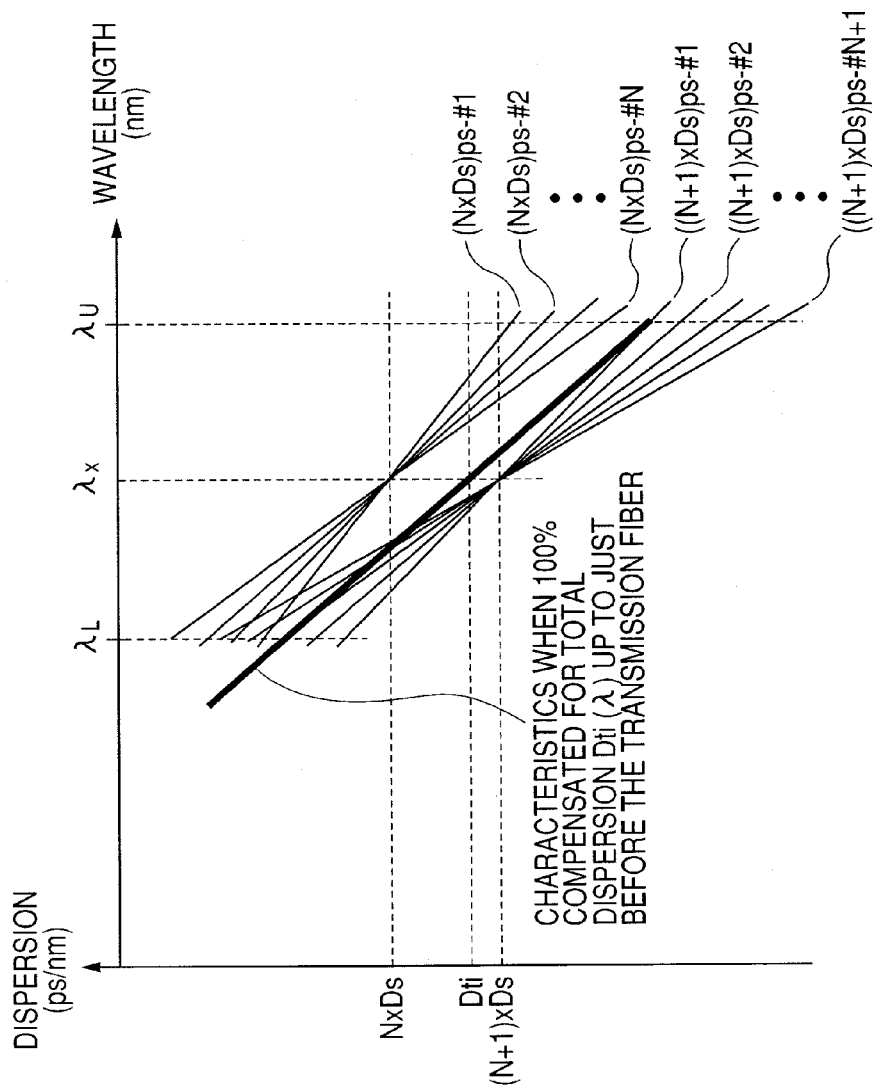
FIG. 12 is a graph for describing the DCF selection technique in the process flow for setting the dispersion compensation.

In a process equivalent to the above described flow as shown in FIG. 12, the two groups (group for dispersion N×Ds, and the group for dispersion (N+1)×Ds) nearest the dispersion on the typical wavelength ($\lambda$x), are selected from among the combination settable on the variable dispersion slope compensator 13 for characteristics during 100 percent compensation of the total dispersion Dti ($\lambda$) just before the transmission fiber. Further, the combination with the smallest squared error at both ends of the wavelength ($\lambda$L and $\lambda$U) is selected from among "(N×Ds) ps-#0", (N×Ds) ps-#1", . . . (N×Ds) ps-#N" and "((N+1)×Ds) ps-#0", (N+1)×Ds) ps-#1", . . . "(N+1)×Ds) ps-#N+1" belonging to these two groups is selected. In this way, a simple algorithm is used to allow selecting a combination with the smallest (or about the smallest) compensation error in the band from among combinations settable on the variable dispersion slope compensator 13. Results from a simulation of the effectiveness of this patent when the selection was made in the above flow process are shown next. In the structure for the transmission system shown in FIG. 10, the number of repeaters was set to 10, and the zero-dispersion wavelength for the transmission fibers 15-1, 2, . . . 10 was set per a uniform random number distribution from 1540 nm ($\lambda$0a) to 1560 nm ($\lambda$0b). The length of the transmission fibers 15-1, 2, . . . 10 was also set by uniform random number distribution between 60 to 90 kilometers. One thousand patterns were generated for the above 10 repeater system, and each pattern was applied to the flow in FIG. 11, the dispersion set for each dispersion slope compensator and, the residual dispersion at the output of each dispersion slope compensator calculated. The dispersion slope was set to 0.07 ps/nm/nm/km, the WDM signal wavelength band was set to 1570 nm ($\lambda$L) on the shortest wavelength side, and to 1610 nm ($\lambda$U) on the longest wavelength side, and the typical wavelength within the signal band was set to 1590 nm ($\lambda$x) which is the center of the band. The DCFa and DCFb are designed to compensate the fiber when the zero-dispersion wavelength distribution is positioned on the shortest wavelength side (1540 nm) and the longest wavelength side (1560 nm), and the dispersion step was set to 50 ps/nm. In other words, the characteristic values of the DCFa and DCFb are the values shown in FIG. 5, and the structure of the variable dispersion slope compensator is that shown in FIG. 1.

Figure 13:
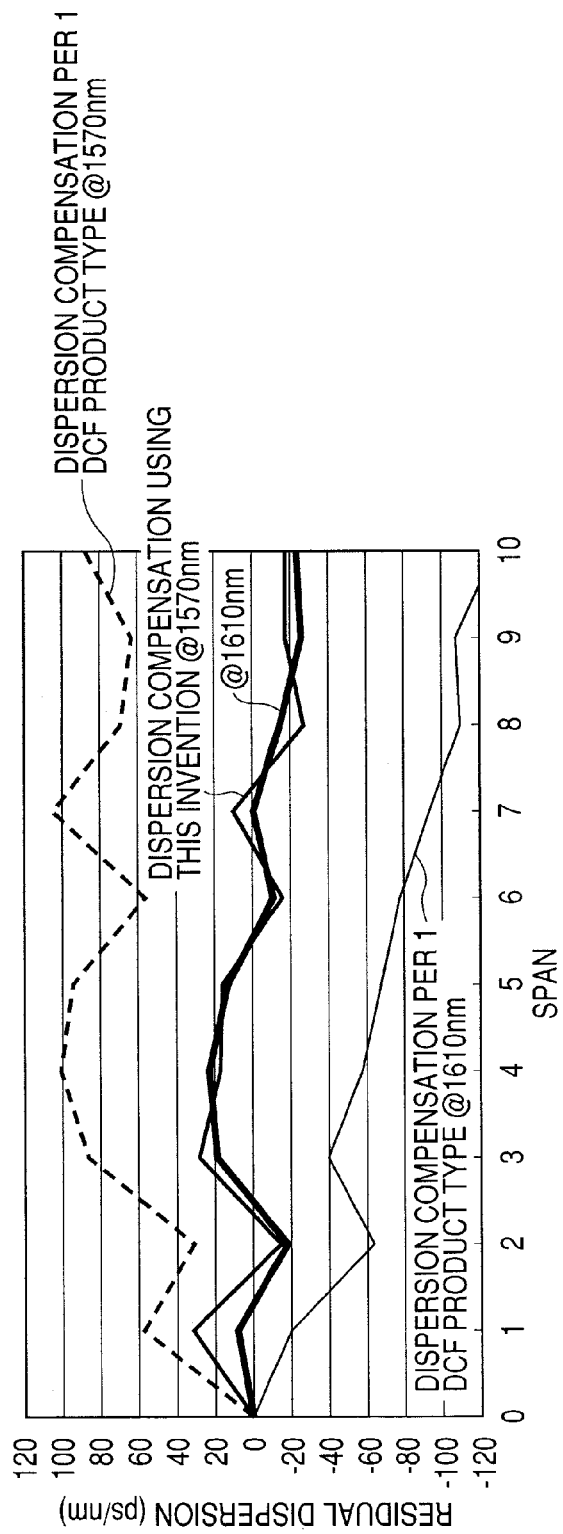
FIG. 13A shows examples of dispersion slope compensation simulation results.
FIG. 13B shows transmission fiber characteristics for each span as well as DCF settings.
Figure 14:
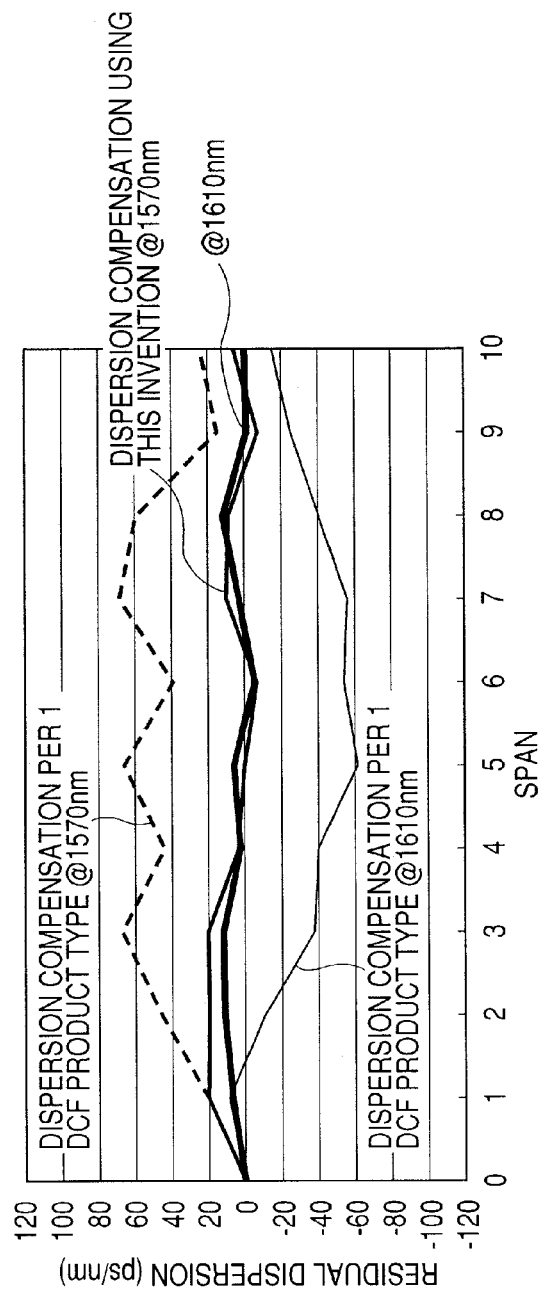
FIG. 14A shows examples of dispersion slope compensation simulation results.
FIG. 14B shows transmission fiber characteristics for each span as well as DCF settings.

FIG. 13 and FIG. 14 show examples of dispersion compensation calculated for the 1,000 patterns. FIG. 13A and FIG. 14A are the residual dispersion at the output of each dispersion slope compensator for each span. FIG. 13B and FIG. 14B show the zero-dispersion wavelength and fiber length (allotted by random numbers) for each span, and the d value and k values for the DCF "d ps-#k" selected per the flow in FIG. 11. FIG. 13A and FIG. 14A show the respective values plotted for the shortest wavelength (1570 nm) and the longest wavelength (1610 nm). For purposes of comparison, FIG. 13A and FIG. 14A show results from the conventional method or in other words, show results when one type of DCF possessing a single relative dispersion slope RDS equivalent to average characteristics (zero dispersion length 1550 nm) on a transmission path were adjust to the dispersion step 50 ps/nm.

When this invention was not applied due to the transmission fiber distribution, the residual dispersion was found to accumulate and sometimes reached ±100 ps/nm as shown in FIG. 13. However, it was found that the residual dispersion could be restricted to within ±20 ps/nm by applying this invention.

The effect of waveform distortion from dispersion becomes more severe in proportion to the square of the transmission signal bit rate. In the case of a 40 Gbps zero-chirped NRZ (non-return to zero) signal for example, the waveform distortion is approximately ±80 ps/nm (though dependent on transmitter and receiver and characteristics) which is a level where the transmission waveform distortion can be ignored. In this case, in systems utilizing dispersion slope compensating fibers where there is only one type of relative dispersion slope as in the related art, the residual dispersion at the receiver after passing through 10 relays, exceeds the allowable dispersion of ±80 ps/nm so that installing a new dispersion compensator just before the receiver is necessary. However, utilizing this invention drastically reduces residual dispersion at the receiver and makes installing a new dispersion compensator at the receiver unnecessary even in the case of FIG. 13. In actual dispersion compensation fibers there is some error between the design value and the actual dispersion. Also, the dispersion's waveform dependence is not strictly speaking linear and is dependent on higher order components protruding upward or protruding downward so that the residual dispersion increases per the results in FIG. 13. However this effect applies not only to this invention but is common to dispersion compensators that utilize dispersion compensation fibers and therefore does not detract from the significance of this invention.

In the example in FIG. 14, the residual dispersion was suppressed to ±20 ps/nm at the receiver even when using dispersion slope compensating fibers of the related art. However, the residual dispersion was found to increase to approximately ±60 ps/nm along the repeater (relay) transmission path. In the case of linear dispersion caused only by waveform distortion, if within the residual dispersion tolerance of the receiver then that waveform distortion can be ignored no matter how much residual dispersion is present along the transmission path. However when considering the interaction of dispersion with nonlinear phenomenon such as self-phase modulation (SPM) or cross phase modulation (XPM) then the residual dispersion should preferably be suppressed not only at the receiver but also each optical relay output on the transmission path. Applying this invention was found to suppress the residual dispersion within ±20 ps/nm at all optical repeater outputs. Therefore considering the interaction of dispersion with nonlinear phenomenon, this invention is effective in suppressing even during strict dispersion compensation on each span.

Figure 15:
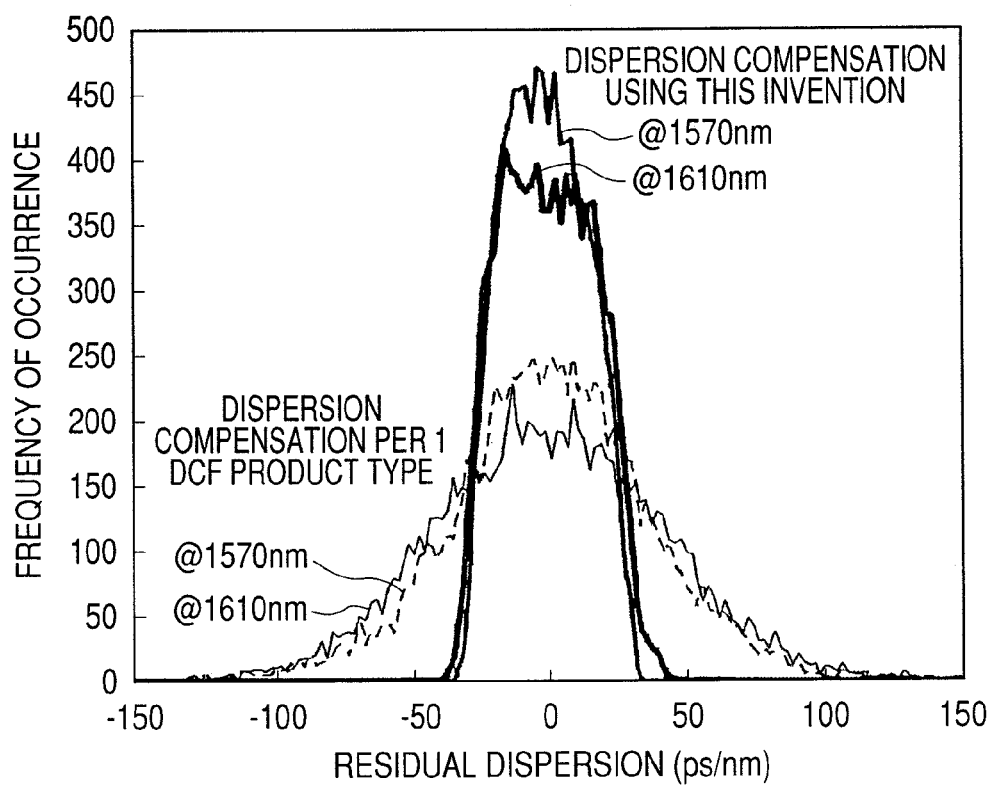
FIG. 15 is a graph showing the residual dispersion distribution after dispersion slope compensation.

FIG. 15 shows the distribution state for 20,000 residual dispersion samples (1,000 patterns, 10 repeaters, dual-wavelength of longest/shortest wavelength) at each repeater output when 1,000 patterns were calculated. The same figure shows the distribution quantity plotted each 2 ps/nm. As shown in this figure, when this invention is applied per characteristics at 1570 nm, the number of samples (or sample count) where the residual dispersion satisfies +0 ps/nm or more, and less than +2 ps/nm, is 47. The standard deviation when this invention is applied is 14.2 at 1570 nm, and 16.4 at 1610 nm. However the standard deviation when utilizing the dispersion compensation fibers of the related art is 35.2 at 1570 nm and 40.9 at 1610 nm. These figures show that this invention was able to suppress the residual dispersion spanning 20,000 samples to within ±50 ps/nm.

Figure 16:
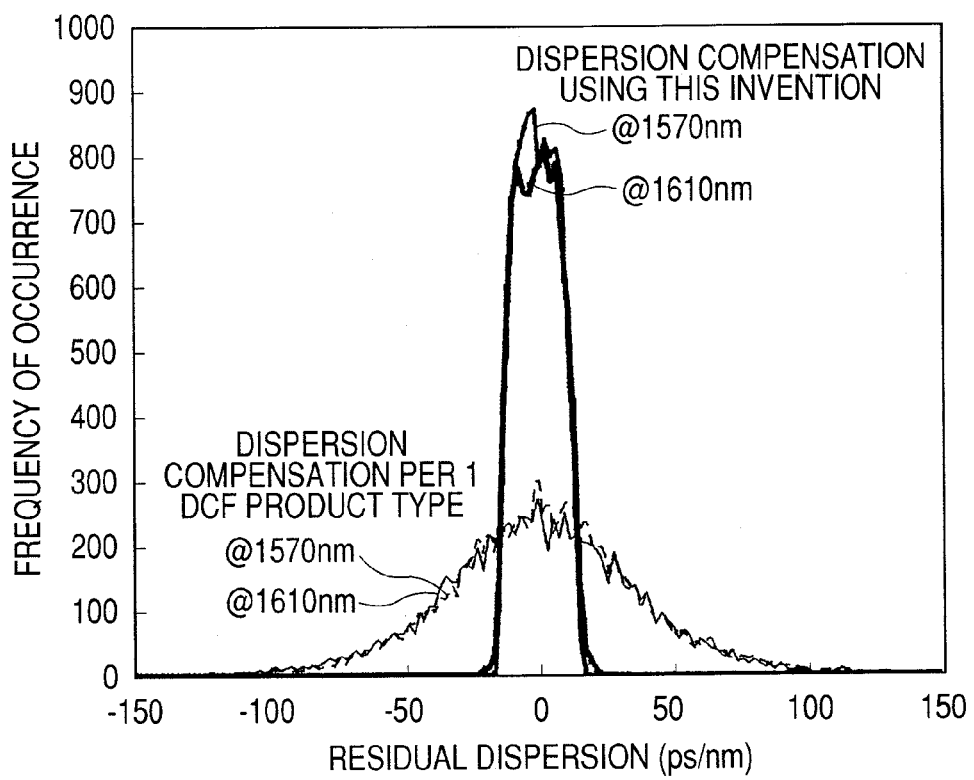
FIG. 16 is a graph showing the residual dispersion distribution after dispersion slope compensation.
Figure 17:
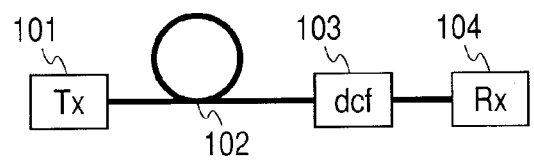
FIG. 17 is a concept diagram showing the system structure including the dispersion slope compensator of the related art.
Figure 18:
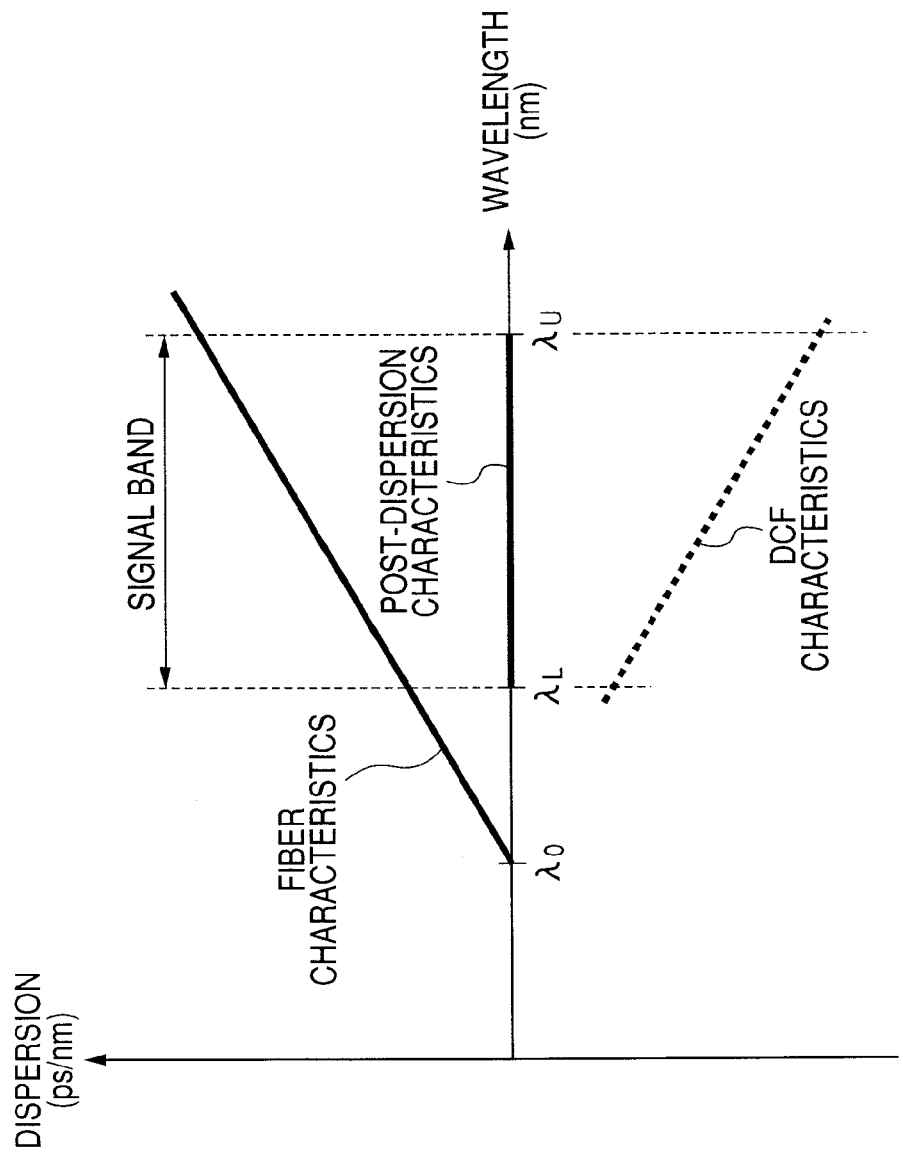
FIG. 18 is a graph for describing the dispersion slope compensation in the related art.
Figure 19:
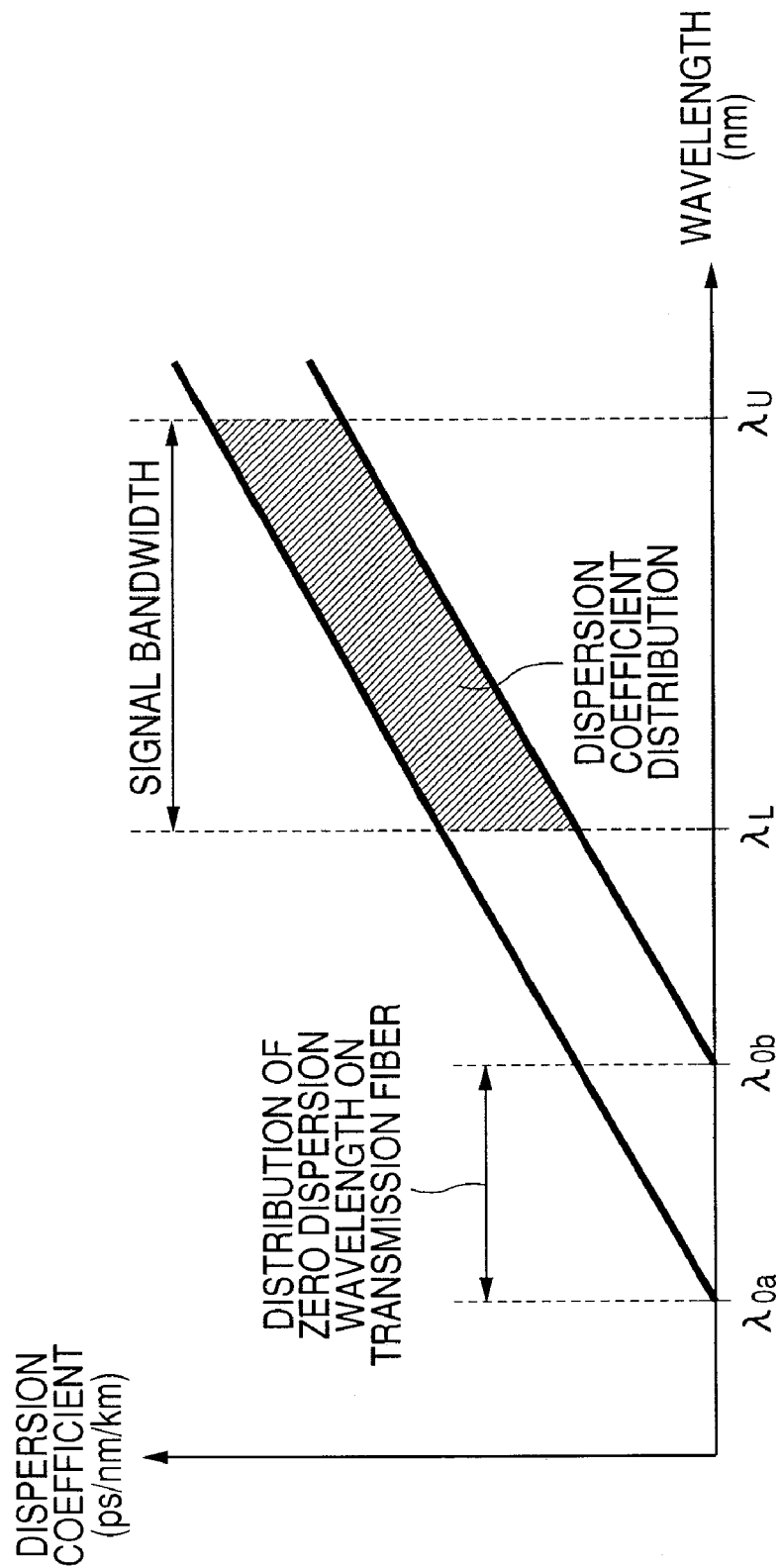
FIG. 19 is a graph for describing zero-dispersion wavelength variations on the transmission fibers.
Figure 20:
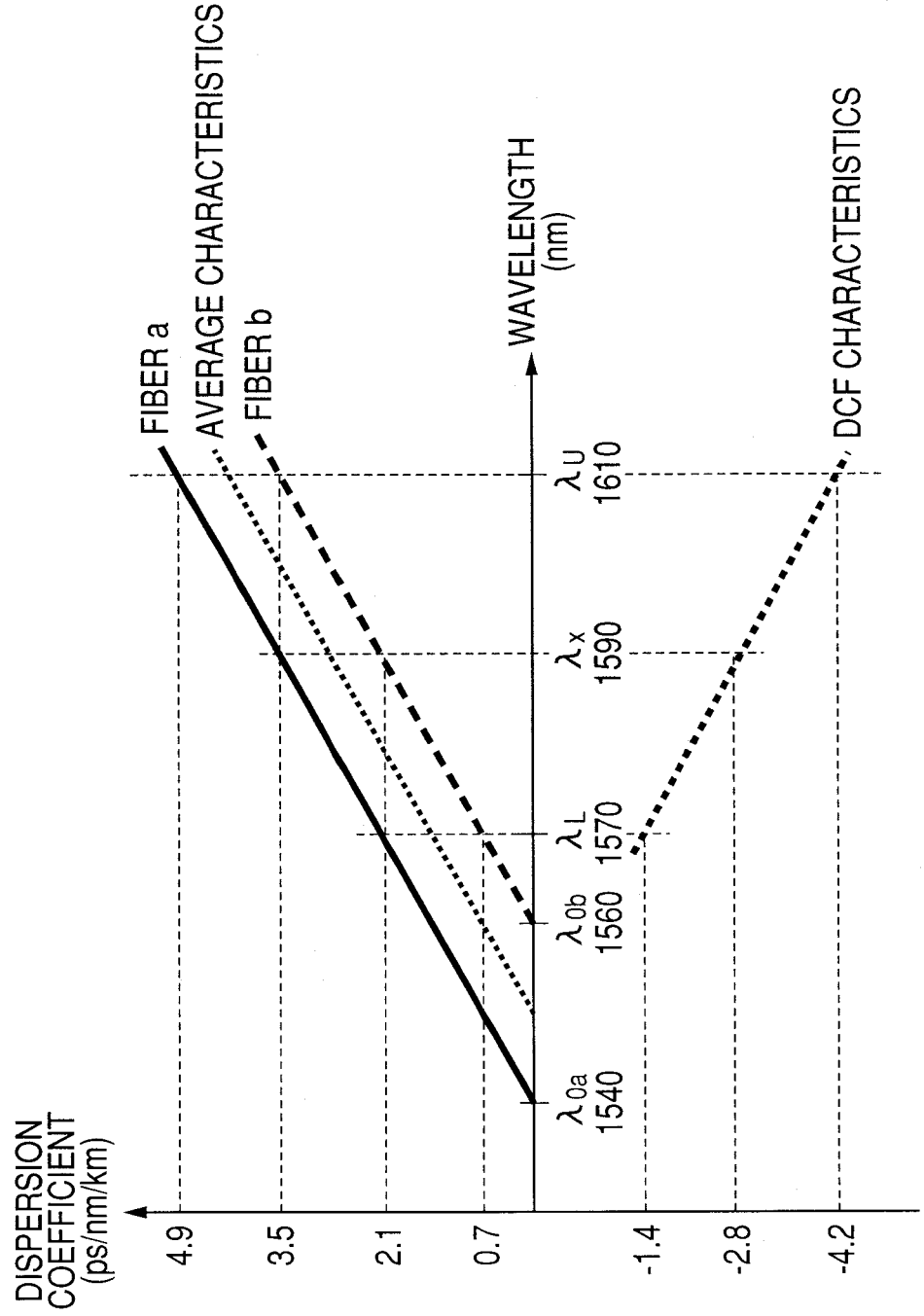
FIG. 20 is a graph for describing the error in dispersion slope compensation in the related art.
Figure 21:
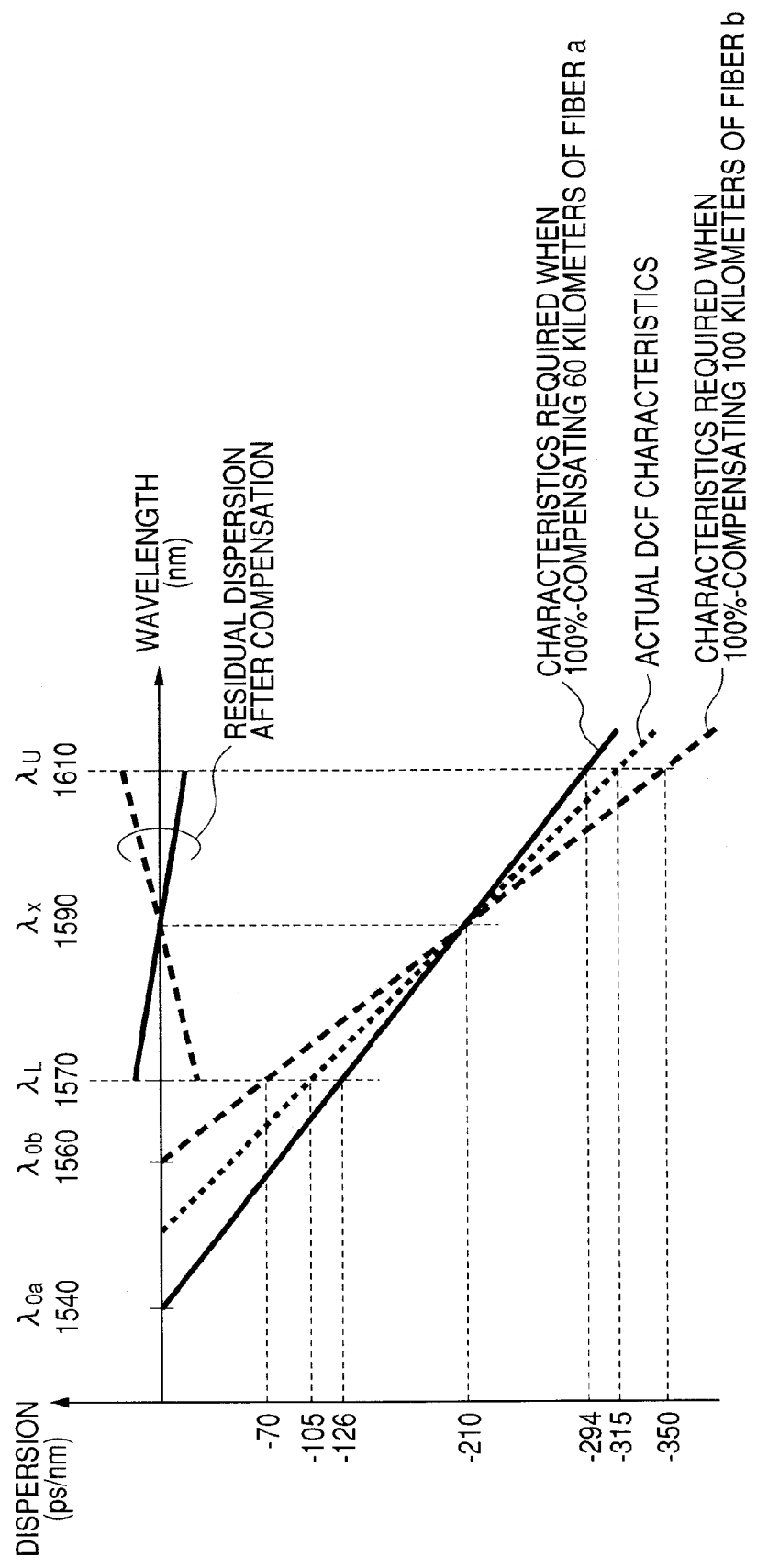
FIG. 21 is a graph for describing the error in dispersion slope compensation in the related art.

FIG. 16 shows the distribution of the residual dispersion when the dispersion step was set to 25 ps/nm in FIG. 8. The effect of this invention has increased even further compared to FIG. 15, with the standard deviation as 7.3 at 1570 nm and 7.9 at 1610 nm when this invention is applied. However, when utilizing the dispersion compensation fibers of the related art is 34.7 at 1570 nm and 36.2 at 1610 nm. When using dispersion compensation fibers of the related art, the compensation accuracy was improved only at the typical wavelength 1590 nm, even when set for dispersion steps of 25 ps/nm; and the residual dispersion at both ends of the 1570 nm and 1610 nm bands showed almost no change from the case where using dispersion steps of 50 ps/nm. In contrast, results showed that this invention was able to suppress the residual dispersion to within ±25 ps/nm over 20,000 samples.

In the flow shown in FIG. 11, the total dispersion Dti (λ) up to just before the transmission fiber 15-$i$, is found by calculating the total sum of the dispersion in the transmission fiber up to just before the variable dispersion slope compensator 11-$i$, and the dispersion (quantity) set on the variable dispersion slope compensator just before the variable dispersion slope compensators installed at each repeater. However in other cases where there is dispersion that cannot be ignored, that dispersion can also be calculated along with the above dispersion (factors). This total dispersion Dti (λ) can also be calculated using the pre-dispersion magnitude when pre-dispersion compensation is performed on the transmitter side. Moreover, though a combination approaching 100 percent for total dispersion Dti (λ) compensation can be selected as in the flow shown in FIG. 11, this invention is still effective and applicable even for flows with excessive compensation (i.e. 110%) or insufficient compensation (i.e. 90%).

The invention as described above, provides an optical transmission system including an optical switch group within the variable dispersion slope compensator capable of being operated by remote control; and that calculates the desired dispersion compensation of each variable dispersion slope compensator based on dispersion information on transmission fibers within the optical transmission system, and by remote operation of the optical switches, the optical transmission system reduces the residual dispersion not only at the receiver but also at each repeater output across the entire optical transmission system.

What is claimed is:

1. A dispersion compensator comprising:
    a first dispersion compensation fiber group containing at least one dispersion compensation fiber;
    a second dispersion compensation fiber group containing at least one dispersion compensation fiber;

a transmission fiber connecting to the dispersion compensation fibers in the first dispersion compensation fiber group or the second dispersion compensation fiber group; and a patch cable group or an optical switching group for changing connections among the dispersion compensation fibers in the first dispersion compensation fiber group or the second dispersion compensation fiber group, the relative dispersion slopes of the first dispersion compensation fiber group and the second dispersion compensation fiber group being different.

2. The dispersion compensator according to claim 1, comprising:

a patch cable group or an optical switching group for making an optional connection combination with the dispersion compensation fibers in the first dispersion compensation fiber group or the second dispersion compensation fiber group, wherein the first dispersion compensation fiber group includes at least two dispersion compensation fibers with a common relative dispersion slope, wherein the second dispersion compensation fiber group includes at least two dispersion compensation fibers with a common relative dispersion slope different from the relative dispersion slope of first dispersion compensation fiber group, and wherein the zero-dispersion wavelength of the dispersion compensation fibers in the first dispersion compensation fiber group is different from the zero-dispersion wavelength of the dispersion compensation fibers in the second dispersion compensation fiber group.

3. The dispersion compensator according to claim 2, wherein the dispersion compensation in each dispersion compensation fiber in the first dispersion compensation fiber group, and the dispersion compensation in each dispersion compensation fiber in the second dispersion compensation fiber group at a typical wavelength are designed to reach an integer multiple of the quantity in the pre-established dispersion compensation step.

4. The dispersion compensator according to claim 3, wherein the typical wavelength is a wavelength in the center of the transmission signal band or a wavelength near the center.

5. The dispersion compensator according to claim 2, wherein the dispersion compensation of each dispersion compensation fiber in the first dispersion compensation fiber group, and each dispersion compensation fiber in the second dispersion compensation fiber group at a typical wavelength is designed to reach 2 to the Nth times (N is an integer) the quantity in the pre-established dispersion compensation step.

6. The dispersion compensator according to claim 2 connected to a transmission fiber, wherein the relative dispersion slope of the first dispersion compensation fiber group matches the relative dispersion slope of the transmission fiber when the transmission fiber zero-dispersion wavelength is positioned on the short wavelength side from the center distribution of the zero-dispersion wavelength;

the relative dispersion slope of the second dispersion compensation fiber group matches the relative dispersion slope of the transmission fiber when the transmission fiber zero-dispersion wavelength is positioned on the long wavelength side from the center distribution of the zero-dispersion wavelength.

7. The dispersion compensator according to claim 1, wherein there are multiple dispersion compensation fiber groups.

* * * * *